United States Patent
Iwasaki

(10) Patent No.: US 10,194,087 B2
(45) Date of Patent: Jan. 29, 2019

(54) TRANSMISSION APPARATUS, SETTING APPARATUS, TRANSMISSION METHOD, RECEPTION METHOD, AND STORAGE MEDIUM

(71) Applicant: CANON KABUSHIKI KAISHA, Tokyo (JP)

(72) Inventor: Takahiro Iwasaki, Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/795,092

(22) Filed: Oct. 26, 2017

(65) Prior Publication Data

US 2018/0048824 A1    Feb. 15, 2018

Related U.S. Application Data

(63) Continuation of application No. 14/443,977, filed as application No. PCT/JP2013/006660 on Nov. 12, 2013, now Pat. No. 9,832,384.

(30) Foreign Application Priority Data

Nov. 21, 2012  (JP) .................................. 2012-255116

(51) Int. Cl.
H04N 5/232    (2006.01)
H04N 21/4223    (2011.01)
(Continued)

(52) U.S. Cl.
CPC ........... *H04N 5/23293* (2013.01); *G09G 5/14* (2013.01); *H04N 5/77* (2013.01); *H04N 9/8042* (2013.01);
(Continued)

(58) Field of Classification Search
CPC ............... H04N 5/232; H04N 5/23293; H04N 5/23296; H04N 5/23206; H04N 5/23216;
(Continued)

(56) References Cited

U.S. PATENT DOCUMENTS

| 6,744,461 B1 * | 6/2004 | Wada | ....................... H04N 7/18 348/143 |
| 7,893,959 B2 * | 2/2011 | Miyata | ............. G08B 13/19686 348/153 |

(Continued)

*Primary Examiner* — Michael Osinski
(74) *Attorney, Agent, or Firm* — Canon U.S.A., Inc. IP Division

(57) ABSTRACT

To transmit and receive an instruction of superposing an image on a predetermined position on a display screen of a picked-up image and an instruction of superposing superposition information in the predetermined range of the picked-up image in accordance with a change in the picked-up image in a transmission and reception system including a single communication interface. A reception unit that receives a parameter from a setting apparatus and a superposition unit that selects a first superposition mode for superposing the superposition information on the predetermined position on the display screen of the picked-up image or a second superposition mode for superposing the superposition information on the position on the picked-up image in accordance with the change in the picked-up image in accordance with the received parameter for superposition of the superposition information.

32 Claims, 17 Drawing Sheets

(51) Int. Cl.
  *H04N 21/485* (2011.01)
  *G09G 5/14* (2006.01)
  *H04N 21/218* (2011.01)
  *H04N 5/77* (2006.01)
  *H04N 9/804* (2006.01)
  *H04N 5/445* (2011.01)

(52) U.S. Cl.
  CPC ... *H04N 21/21805* (2013.01); *H04N 21/4223* (2013.01); *H04N 21/4858* (2013.01); *G09G 2340/10* (2013.01); *H04N 5/44513* (2013.01)

(58) Field of Classification Search
  CPC .. H04N 5/44591; H04N 5/77; H04N 5/44513; H04N 7/18; H04N 21/21805; H04N 21/4223; H04N 21/4312; H04N 21/4314; H04N 21/4316; H04N 21/44008; H04N 21/4858; H04N 21/23614; H04N 21/4882; H04N 21/4886; H04N 9/8042; G08B 13/19686; G08B 13/1963; G09G 5/14; G09G 2340/10
  See application file for complete search history.

(56) References Cited

U.S. PATENT DOCUMENTS

| | | | | |
|---|---|---|---|---|
| 8,259,157 | B2* | 9/2012 | Yanagisawa | H04N 7/147 348/14.08 |
| 8,314,888 | B2* | 11/2012 | Ueda | H04N 5/45 348/561 |
| 8,514,281 | B2* | 8/2013 | Kogane | G08B 13/19686 348/143 |
| 8,724,027 | B2* | 5/2014 | Yuki | H04N 21/488 348/564 |
| 8,922,718 | B2* | 12/2014 | House | H04N 9/75 348/589 |
| 9,202,521 | B2* | 12/2015 | Makino | G11B 27/031 |
| 9,204,050 | B2* | 12/2015 | Emura | G06F 3/0488 |
| 2003/0227555 | A1* | 12/2003 | Kobayashi | G08B 13/1963 348/231.6 |
| 2005/0005292 | A1* | 1/2005 | Kimata | H04N 5/44543 725/44 |
| 2008/0036877 | A1* | 2/2008 | Arima | H04N 7/18 348/231.8 |
| 2008/0079754 | A1* | 4/2008 | Kuroki | H04N 5/45 345/660 |
| 2009/0073322 | A1* | 3/2009 | Shibahara | G06K 9/00711 348/726 |
| 2009/0128702 | A1* | 5/2009 | Suzuki | G09G 5/00 348/589 |
| 2009/0179982 | A1* | 7/2009 | Yanagisawa | H04N 7/147 348/14.1 |
| 2010/0060789 | A1* | 3/2010 | Aoki | G09G 5/14 348/563 |
| 2010/0118164 | A1* | 5/2010 | Fujita | H04N 5/23203 348/239 |
| 2010/0265401 | A1* | 10/2010 | Yuki | G09G 5/14 348/565 |
| 2011/0013087 | A1* | 1/2011 | House | A63B 24/0021 348/564 |
| 2011/0074978 | A1* | 3/2011 | Kogane | G08B 13/19686 348/240.3 |
| 2011/0102678 | A1* | 5/2011 | House | H04N 9/75 348/584 |
| 2011/0144498 | A1* | 6/2011 | Ando | A61B 8/466 600/443 |
| 2011/0211802 | A1* | 9/2011 | Kamada | G11B 27/034 386/201 |
| 2011/0228119 | A1* | 9/2011 | Maruyama | H04N 5/23212 348/222.1 |
| 2012/0098854 | A1* | 4/2012 | Ohnishi | G03B 21/26 345/626 |
| 2012/0320248 | A1* | 12/2012 | Igarashi | G01C 21/32 348/333.01 |
| 2013/0100163 | A1* | 4/2013 | Oka | H04N 5/2624 345/629 |
| 2013/0120529 | A1* | 5/2013 | Nio | H04N 13/007 348/43 |
| 2013/0187954 | A1* | 7/2013 | Saito | G06T 11/60 345/634 |
| 2013/0191861 | A1* | 7/2013 | Sasaki | H04N 21/236 725/32 |
| 2013/0235078 | A1* | 9/2013 | Takahashi | G06T 11/00 345/633 |
| 2014/0098259 | A1* | 4/2014 | Song | H04N 1/387 348/231.6 |
| 2014/0192164 | A1* | 7/2014 | Tenn | H04N 13/0242 348/47 |
| 2014/0213361 | A1* | 7/2014 | Zhang | G06F 3/011 463/31 |
| 2016/0014478 | A1* | 1/2016 | Ejima | H04N 21/4316 725/32 |
| 2016/0277652 | A1* | 9/2016 | Mori | H04N 5/232 |

* cited by examiner

FIG. 15A

```
┌─────────────────────────────────────────┐
│          OSD Configuration Window        │
│  ┌─────┐┌─────┐┌─────┐┌─────┐┌──→       │
│  │OSD 1││OSD 2││OSD 3││OSD 4│           │
│  ┌─OSD Mode─────────────────────────┐   │
│  │ ● Mode 1 (FIXED) ─7000  ○ Mode 2 (FLOATING) │
│  └──────────────────────────────────┘   │
│  ┌─OSD Type─────────────────────────┐   │
│  │ ● TEXT         ─7001   ○ IMAGE   │   │
│  └──────────────────────────────────┘   │
│  ┌─OSD Position─────────────────────┐   │
│  │ ● UPPER_LEFT   ─7002  ○ LOWER_LEFT │ │
│  │ ○ UPPER_RIGHT         ○ LOWER_RIGHT │ │
│  │ ○ CUSTOM   X: [      ]  Y: [      ] │ │
│  └──────────────────────────────────┘   │
│  ┌─TEXT Detail──────────────────────┐   │
│  │ ● Time and Date  ─7003           │   │
│  │ ○ Bitrate                        │   │
│  │ ○ Text Strings [              ]  │   │
│  │ Font Color:       ● Blue ○ Red ○ Green ○ White │
│  │ Background Color: ○ Blue ○ Red ○ Green ○ White ● None │
│  └──────────────────────────────────┘   │
│              ─7004                      │
│  ┌─IMAGE Detail─────────────────────┐   │
│  │ Image File Path                  │   │
│  │ [                              ] │   │
│  └──────────────────────────────────┘   │
│      ─7005    ─7006    ─7007            │
│  [CREATE] [MODIFY] [DELETE] [CANCEL]    │
└─────────────────────────────────────────┘
```

FIG. 15C

OSD Configuration Window

| OSD 1 | OSD 2 | OSD 3 | OSD 4 | → |

OSD Mode
- ○ Mode 1 (FIXED) — 7000
- ● Mode 2 (FLOATING)

OSD Type — 7001
- ○ TEXT
- ● IMAGE

OSD Position
- ○ UPPER_LEFT — 7002
- ○ UPPER_RIGHT
- ● CUSTOM  X: 0.3  Y: 0.3
- ○ LOWER_LEFT
- ○ LOWER_RIGHT

TEXT Detail — 7003
- ○ Time and Date
- ○ Bitrate
- ○ Text Strings [ ]
- Font Color: ○ Blue ○ Red ○ Green ○ White
- Background Color: ○ Blue ○ Red ○ Green ○ White ○ None

IMAGE Detail — 7004
- Image File Path
- http://192.168.100.1/localimage/OSD_FLOATING.jpg

[ CREATE ]  [ MODIFY ]  [ DELETE ]  [ CANCEL ]

TRANSMISSION APPARATUS, SETTING APPARATUS, TRANSMISSION METHOD, RECEPTION METHOD, AND STORAGE MEDIUM

CROSS-REFERENCE TO RELATED APPLICATION

This is a continuation of, and claims the benefit of, U.S. patent application Ser. No. 14/443,977, filed May 19, 2015, as a National Stage application pursuant to 35 U.S.C. 371, which claims the benefit of PCT/JP2013/000660, filed Nov. 12, 2013, and Japanese Patent Application No. 2012-255116, filed Nov. 21, 2012, each of which are hereby incorporated by reference herein in their entirety.

TECHNICAL FIELD

The present invention relates to a technology for instructing an apparatus that superposes an image on a picked-up image to perform image superposition.

BACKGROUND ART

Up to now, a technology for a transmission apparatus to superpose a predetermined superposition image on a predetermined position on a display screen of a picked-up image and transmit the superposition image to a reception apparatus is proposed. For example, an on-screen display (OSD) function or the like where the superposition information is displayed on a fixed position on the display screen of the transmitted picked-up image is proposed.

PTL 1 discloses an image pickup apparatus that, when a casing of a camera is moved in a pan or tilt direction, moves a position of a cursor on the display screen while corresponding to the direction in which the casing is moved.

In addition, up to now, a technology with which the position of the superposition image on the display screen of the transmitted picked-up image is dynamically changed is proposed. For example, a floating OSD function, a masking function, or the like with which the position where the superposition information is displayed is changed in accordance with the position or the like of the predetermined subject in the picked-up image is proposed.

PTL 2 discloses an image pickup apparatus that superposes a mask image so as to keep masking the predetermined subject even in a case where the image pickup direction is changed while the camera is panned or tilted.

Up to now, a communication interface for instructing the transmission apparatus to superpose the image on the predetermined position on the display screen of the picked-up image and a communication interface for instructing the transmission apparatus to superpose the image while the superposition position is changed in accordance with the change in the picked-up image are separately provided.

Therefore, a setting apparatus that includes only one of these communication interfaces can instruct only one of the above-described instructions with respect to the image pickup apparatus.

CITATION LIST

Patent Literature

[PTL 1] Japanese Patent Laid-Open No. 7-131684
[PTL 2] Japanese Patent Laid-Open No. 2001-069494

SUMMARY OF INVENTION

The present invention provides a transmission and reception system including a single communication interface in which it is possible to perform transmission and reception of an instruction of superposing an image on a predetermined position on a display screen of a picked-up image and an instruction of superposing superposition information in a predetermined range of the picked-up image in accordance with a change in the picked-up image.

To solve the above-described problem, a transmission apparatus according to an aspect of the present invention includes, for example, a reception unit configured to receive a parameter for setting a superposition mode in which superposition information is superposed on an image picked up by an image pickup unit from a setting apparatus, and a superposition unit configured to select one of a first superposition mode in which the superposition information is superposed on a predetermined position on a display screen of the picked-up image and a second superposition mode in which the superposition information is superposed on a position of the picked-up image in accordance with a change in the picked-up image displayed on the display screen in accordance with the parameter received by the reception unit and superpose the picked-up image on the superposition information.

Alternatively, to solve the above-described problem, a transmission apparatus according to another aspect of the present invention includes, for example, a reception unit configured to receive a parameter for setting a superposition mode in which superposition information is superposed on an image picked up by an image pickup unit from a setting apparatus, and a superposition unit configured to select one of a first superposition mode in which the superposition information is superposed on a predetermined position on a display screen of the picked-up image and a second superposition mode in which the superposition information is superposed on a predetermined position in an image pickup available range where the image pickup unit can perform image pickup in accordance with the parameter received by the reception unit and superpose the picked-up image on the superposition information. Alternatively, to solve the above-described problem, a transmission apparatus according to still another aspect of the present invention includes, for example, a reception unit configured to receive a parameter for setting a superposition mode in which superposition information is superposed on an image picked up by an image pickup unit from a setting apparatus, a drive unit configured to change an image pickup direction of the image pickup unit, and a superposition unit configured to select one of a first superposition mode in which the superposition information is superposed on the picked-up image while a position of the superposition information on an image pickup available range where the image pickup unit can perform image pickup is changed in accordance with the change in the image pickup direction and a second superposition mode in which the superposition information is superposed on the picked-up image without changing the position of the superposition information on the image pickup available range in accordance with the parameter received by the reception unit and superpose the superposition information on the picked-up image.

In addition, to solve the above-described problem, a setting apparatus according to an aspect of the present invention is, for example, a setting apparatus that transmits a parameter for setting a superposition mode in which superposition information is superposed on an image picked up by an image pickup unit to a transmission apparatus and includes a setting unit configured to set a first superposition mode in which the superposition information is superposed on the predetermined position on a display screen of the picked-up image and a second superposition mode in which the superposition information is superposed on a position on the picked-up image in accordance with a change in the picked-up image displayed on the display screen, a transmission unit configured to transmit different parameters in a case where the setting unit sets the first superposition mode and a case where the setting unit sets the second superposition mode to the transmission apparatus, and a reception unit configured to receive the picked-up image on which the superposition information is superposed from the transmission apparatus.

Further features of the present invention will become apparent from the following description of exemplary embodiments with reference to the attached drawings.

BRIEF DESCRIPTION OF DRAWINGS

FIG. 15A illustrates a first example of a user interface for setting superposition information.

FIG. 15C illustrates a third example of the user interface for setting the superposition information.

DESCRIPTION OF EMBODIMENTS

Hereinafter, embodiments of the present invention will be described in detail with reference to the drawings. According to the following embodiments, an example will be described in which a communication is conducted between an image pickup apparatus and a reception apparatus by using an interface specified in Open Network Video Interface Forum (ONVIF) where an interface of an image pickup apparatus is discussed.

However, the present invention is not limited to the communication using the interface specified in ONVIF but can also be applied to a case where a communication is conducted between the image pickup apparatus and the reception apparatus through the other methods.

First Embodiment

Figure 1A:
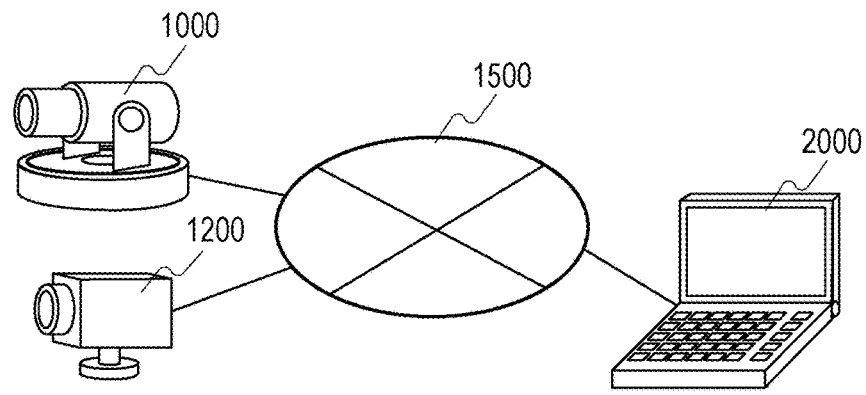
FIG. 1A is an explanatory diagram for describing an image pickup system.

A configuration of an image pickup system according to a first embodiment will be descried by using FIG. 1A. As illustrated in FIG. 1A, in the image pickup system according to the present embodiment, an image pickup apparatus 1000, an image pickup apparatus 1200, and a reception apparatus 2000 are connected to each other via a network 1500.

The image pickup apparatus 1000 and the reception apparatus 2000 are connected via the network 1500 so as to be mutually communicable. The image pickup apparatus 1200 and the reception apparatus 2000 are also connected via the network 1500 so as to be mutually communicable. For example, the network 1500 is composed of the internet, a wireless local area network (LAN), a wireless LAN, a wide area network (WAN), or the like. Any appropriate communication standard, scale, and configuration can be employed for the network 1500. For example, Ethernet (registered trademark) or the like can be used as the communication standard for the LAN.

The reception apparatus 2000 is configured to transmit various commands such as an image pickup parameter change which will be described below, a camera platform drive, and a video stream start with respect to the image pickup apparatus 1000. The reception apparatus 2000 is a setting apparatus configured to set a superposition mode for superposing the superposition information on the image picked up by the image pickup apparatus 1000. The image pickup apparatus 1000 is a transmission apparatus configured to transmit responses to those commands or video streaming to the reception apparatus 2000.

Figure 1B:
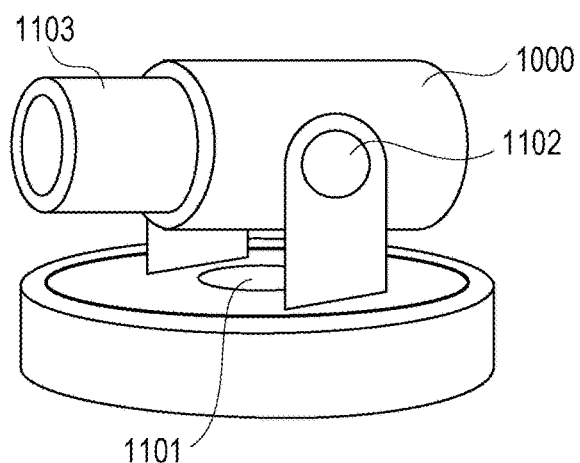
FIG. 1B illustrates an example of an image pickup apparatus according to a first embodiment.

FIG. 1B illustrates a configuration of the image pickup apparatus 1000. A pan mechanism 1101 is a mechanism for changing an orientation of a lens in a pan direction. In addition, a tilt mechanism 1102 is a mechanism for changing the orientation of the lens in a tilt direction. Furthermore, a zoom mechanism 1103 is a mechanism for driving the lens and changing an angle of view for the image pickup of the image pickup apparatus 1000. The image pickup apparatus 1000 can change an image pickup direction of an image pickup unit 1003 in the pan direction and the tilt direction by the pan mechanism 1101 and the tilt mechanism 1102. The image pickup apparatus 1000 can perform a zoom operation by using the zoom mechanism 1103. The pan mechanism 1101, the tilt mechanism 1102, or the zoom mechanism 1103 can thus change the image pickup direction of the image pickup unit 1003 as described above.

According to the present embodiment, a case in which the image pickup apparatus includes the pan mechanism, the tilt mechanism, and the zoom mechanism will be described, but the present invention can also be applied to the image pickup apparatus 1200 that has none of these functions or does not have some of the configurations.

Figure 2A:
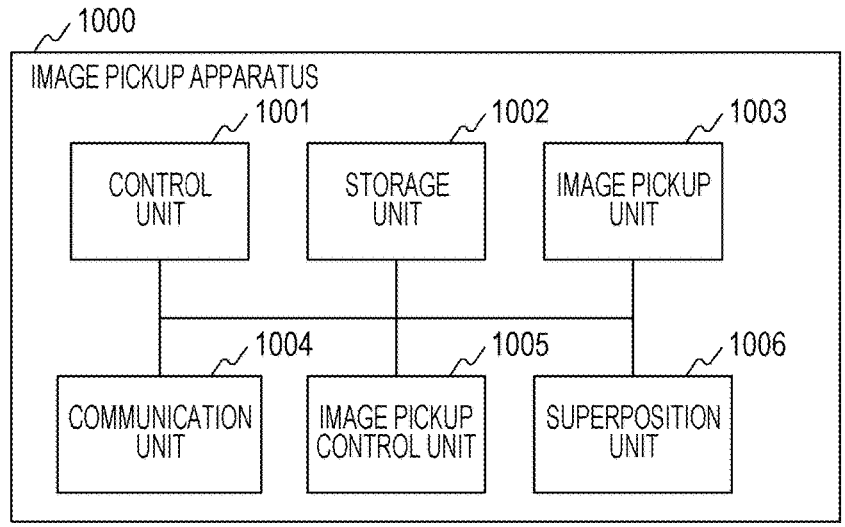
FIG. 2A illustrates a functional configuration of the image pickup apparatus according to the first embodiment.

Next, a function configuration of the image pickup apparatus 1000 according to the present embodiment will be described by using FIG. 2A. In FIG. 2A, a control unit 1001 is configured to control the entirety of the image pickup apparatus 1000. The control unit 1001 is composed, for example, of a processor such as a central processing unit (CPU). In a case where the control unit 1001 is structured as a processor, the control unit 1001 reads out and executes a program stored in a storage unit 1002, so that operations of the respective units of the image pickup apparatus 1000 illustrated in FIG. 2A are controlled. The control unit 1001 performs a control so as to output parameters received by a communication unit 1004 which will be described below from the reception apparatus 2000 to a superposition unit 1006 which will also be described below and to cause the superposition unit 1006 to perform processing of superposing superposition information in accordance with the parameters on the picked-up image.

The storage unit 1002 temporarily saves an image that has been picked up by the image pickup unit 1003 which will be described below or output data that has been output by the control unit 1001. In a case where the control unit 1001 includes a built-in processor such as a CPU, the storage unit 1002 records a program to be executed by the processor.

According to the present embodiment, the storage unit 1002 changes a superposition position of an on-screen display (OSD) in accordance with a change in the picked-up image and records a floating OSD program for superposing superposition information in a predetermined range of the picked-up image. According to the present embodiment, even in a case where the image pickup direction or the angle of view of the image pickup unit 1003 is changed, the floating OSD program performs the superposition processing of the superposition information so that the superposition information is superposed on a position in accordance with the position of the predetermined subject image on the display screen of the picked-up image. The position in accordance with the subject image includes, for example, up, down, left, or right of the subject, a position on the subject image, or the like.

According to the present embodiment, a description will be given of floating OSD processing in a case where the predetermined subject is an immovable subject (for example, a case where the predetermined subject is a house, a signboard, or the like). With the floating OSD program, the image pickup unit 1003 operates the pan mechanism 1101, the tilt mechanism 1102, or the zoom mechanism 1103 and performs the superposition processing so that the superposition position of the superposition information in an image pickup available range 5000 where the image pickup can be conducted is not changed. The floating OSD program can thus continue superposing the superposition information in the predetermined range of the picked-up image in accordance with the change in the picked-up image as described above. For example, according to the floating OSD program, even in a case where the image pickup direction of the image pickup unit 1003 is changed, it is possible to continue superposing the superposition information so as to track the predetermined subject in the picked-up image (for example, the immovable subject such as the house). In a case where the superposition processing of the superposition information is conducted by the floating OSD program, the position of the superposition information on the display screen of the picked-up image is changed in accordance with the change in the image pickup direction or the angle of view of the image pickup unit 1003.

Also, according to the present embodiment, the storage unit 1002 records a fixed OSD program for superposing the superposition information such as a text or an image (for example, an OSD) on the predetermined position on the display screen of the picked-up image. With this fixed OSD program, the superposition processing of the superposition information is conducted so that, even in a case where the image pickup direction or the angle of view of the image pickup unit 1003 is changed, the superposition information (for example, the OSD) is superposed on the predetermined position on the display screen of the picked-up image (for example, one of the four corners of the display screen, the center of the image, or the like).

With the fixed OSD program, the superposition processing is conducted in which the superposition position of the superposition information on the image pickup available range where the image pickup unit 1003 can perform the image pickup by operating the pan mechanism 1101, the tilt mechanism 1102, or the zoom mechanism 1103 is changed in accordance with the change in the image pickup direction or the angle of view of the image pickup unit 1003.

The storage unit 1002 is used for temporarily saving parameters used when the processor executes the program. The storage unit 1002 also stores a communication parameter for the communication unit 1004 which will be described below to perform a communication with the reception apparatus. The communication parameter includes, for example, an IP address of the reception apparatus or the like.

The storage unit 1002 further stores various parameters with respect to the image pickup apparatus 1000. For example, the storage unit 1002 holds values of a pan angle, a tilt angle, and a zoom magnification of the image pickup unit 1003 as the parameters with respect to the image pickup apparatus 1000. The storage unit 1002 also holds, for example, a parameter for setting the superposition information as the parameters with respect to the image pickup apparatus 1000. According to the present embodiment, the parameter for setting the superposition information functions as a parameter indicating whether the position of the superposition information on the display screen of the picked-up image is variable or fixed.

The parameter for setting the superposition image can include, for example, a parameter indicating whether the superposition information is text information or image information. The parameter for setting the superposition image can also include, for example, a parameter for specifying a type of the text information in a case where the superposition information is set as the text information. The parameter for setting the superposition image can also include, for example, a parameter for specifying a type of the image information in a case where the superposition information is set as the image information. The parameters held by the storage unit 1002 will be described in detail below by using FIG. 3 and FIG. 15A, FIG. 15B, and FIG. 15C.

The storage unit 1002 may also be composed as plural different storage media. The storage unit 1002 is composed, for example, of a random access memory (RAM), a read only memory (ROM), or the like. Removable media may also be used as the storage unit 1002. The storage unit 1002 may also be composed of an external storage apparatus such as a memory card.

The image pickup unit 1003 is configured to convert an analog signal obtained by picking up an image of a subject into digital data and also perform data compression processing such as adaptive discrete cosine transform (ADCT) to generate a picked-up image to be output to the storage unit 1002. The image pickup unit 1003 outputs the picked-up image to the storage unit 1002 and thereafter issues an image obtainment event to the control unit 1001. The image pickup unit 1003 is composed of a lens, an image pickup sensor such as a complementary metal oxide semiconductor (CMOS), or the like. An image pickup element converts an image of a subject imaged by the lens into an image signal.

The communication unit 1004 receives an instruction of superposing the superposition information (for example, the OSD or the mask image) that is set in accordance with the parameter specified by the reception apparatus 2000 on the picked-up image together with the parameter from the reception apparatus 2000. The parameter received from the reception apparatus 2000 will be described in detail by using FIG. 15A, FIG. 15B, and FIG. 15C.

The communication unit 1004 also receives a control command from the reception apparatus 2000. This control command is a command for causing the image pickup apparatus 1000 to execute various processing. The communication unit 1004 also transmits a response to the control command received from the reception apparatus 2000 to the reception apparatus 2000. Examples of the control command and the response to the control command will be described below by using FIG. 4, FIG. 5A and FIG. 5B.

An image pickup control unit 1005 is configured to control the operations of the pan mechanism 1101, the tilt mechanism 1102, and the zoom mechanism 1103 in accordance with the pan angle value, the tilt angle value, and the zoom magnification value input by the control unit 1001. The image pickup control unit 1005 also notifies the control unit 1001 of the current pan angle value, the current tilt angle value, and the current zoom magnification value in response to a query from the control unit 1001.

The superposition unit 1006 is configured to superpose the superposition information on the picked-up image on the basis of the parameter for setting the superposition information input from the control unit 1001. The superposition information includes, for example, a so-called OSD, a mask image, or the like. The mask image is an image superposed on the picked-up image to restrict viewing of a part or an entirety of the picked-up image. The part or the entirety of the picked-up image may be blurred or mosaic processing may be conducted instead of using the mask image.

For example, a position of the superposition information on the picked-up image, a type of the superposition information, a background color, or the like is relevant to the parameter for setting the superposition information. According to the present embodiment, the parameter for setting the superposition information includes a parameter for setting a superposition mode for superposing the superposition information on the image picked up by the image pickup unit. The superposition unit 1006 selects whether the superposition position on the display screen of the picked-up image is variable or fixed for each superposition information on the basis of the input parameter and superposes the superposition information on the picked-up image. That is, the superposition processing is conducted by selecting one of a first superposition mode for superposing the superposition information on a predetermined position on the display screen of the picked-up image and a second superposition mode for superposing the superposition information in a predetermined range of the picked-up image while tracking the change in the picked-up image displayed on the display screen. In the second superposition mode, the superposition information is superposed on an image pickup range of the image pickup unit or an area on the display screen in accordance with the change in the picked-up image.

In a case where the parameter indicating the fixed position of the superposition information on the display screen of the picked-up image is input from the control unit 1001, even when the image pickup direction or the angle of view of the image pickup unit 1003 is changed, the superposition unit 1006 superposes the superposition information in a manner that the position of the superposition information on the display screen is not changed. For example, in a case where the parameter for fixing the position of the superposition information on the display screen of the picked-up image at the upper left of the picked-up image is input, even when the image pickup direction or the angle of view of the image pickup unit 1003 is changed, the superposition of the superposition information is conducted in a manner that the superposition information is displayed on the upper left of the display screen of the picked-up image.

On the other hand, in a case where the parameter indicating the variable position of the superposition information on the display screen of the picked-up image is input from the control unit 1001, the superposition unit 1006 superposes the superposition information while the position of the superposition information on the display screen is changed in accordance with the change in the image pickup direction or the angle of view of the image pickup unit 1003. That is, the superposition information is superposed in the predetermined range of the picked-up image while tracking the change in the picked-up image displayed on the display screen. For example, even when the image pickup direction or the angle of view is changed, the superposition of the superposition information continues while tracking a particular subject. The superposition unit 1006 selects the superposition method (superposition mode) of the superposition information in accordance with the parameters received from the reception apparatus 2000 and superposes the superposition information on the picked-up image as described above.

The superposition unit 1006 also sets an OSD valid flag for each superposition information and performs a control so that the superposition information is output if the OSD valid flag is True, and the superposition information is not output if the OSD valid flag is False.

The superposition unit 1006 also changes the program used for the superposition of the superposition information between a case where the superposition position of the superposition information on the display screen of the picked-up image is fixed and a case where the superposition position is variable. For example, in a case where the parameter for fixing the superposition position of the superposition information on the display screen of the picked-up image is input from the control unit 1001, the superposition unit 1006 activates the fixed OSD program and performs the superposition of the superposition information. On the other hand, in a case where the parameter for setting the position of the superposition information on the display screen of the picked-up image to be variable is input from the control unit 1001, the superposition unit 1006 activates the floating OSD program for superposition and performs the superposition of the superposition information.

Hereinafter, a function for setting the superposition position of the superposition information on the display screen of the picked-up image to be variable is referred to as position information update function. The superposition unit 1006 sets the display position of the superposition information on the display screen of the picked-up image to be variable in a case where the position information update function is ON. On the other hand, in a case where the position information update function is OFF, the superposition unit 1006 fixes the display position of the superposition information on the display screen of the picked-up image.

The internal configuration of the image pickup apparatus 1000 has been described above by using FIG. 2A. The function configuration diagram illustrated in FIG. 2A is used for describing an example of the embodiment of the present invention and is not limited to this. For example, the image pickup apparatus 1000 may be provided with an audio input unit that inputs audio, and various modifications and alterations can be made within the gist of the present invention.

Figure 2B:
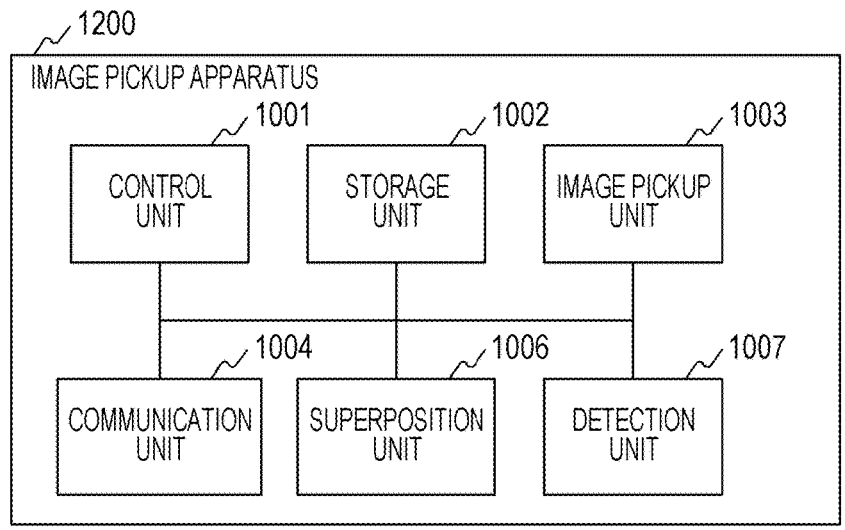
FIG. 2B illustrates a functional configuration of the image pickup apparatus according to the second embodiment.
Figure 2C:
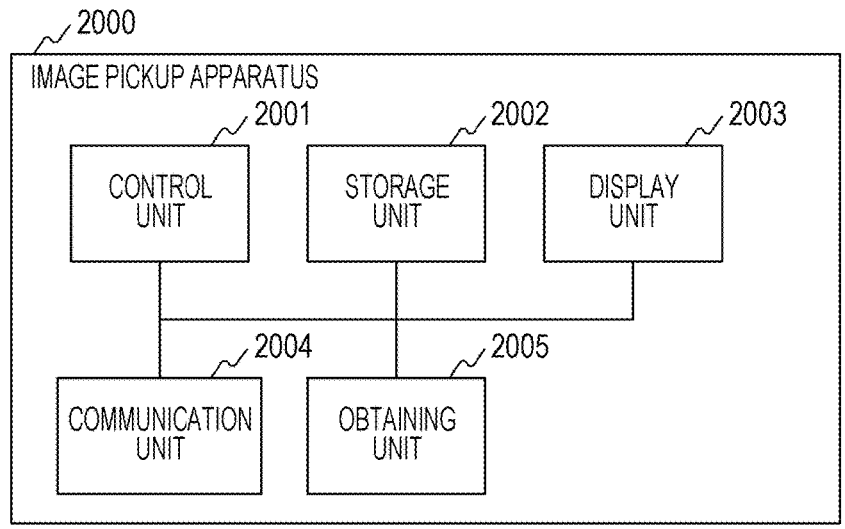
FIG. 2C illustrates a functional configuration of a reception apparatus.

Next, a configuration of the reception apparatus 2000 will be described by using FIG. 2C. A control unit 2001 is configured to perform a control on an entirety of the reception apparatus 2000. The control unit 2001 is composed, for example, of a processor such as a CPU. In a case where the control unit 2001 is structured as a processor, the control unit 2001 reads out and executes a program stored in storage unit 2002 to control operations by the respective configurations of the reception apparatus 2000 illustrated in FIG. 2C. The control unit 2001 controls a communication unit 2004 to transmit the parameter for setting the superposition information to the image pickup apparatus 1000. The control unit 2001 also controls the communication unit 2004 to transmit an instruction of superposing the superposition information in accordance with the parameter on the picked-up image to the image pickup apparatus 1000. The control unit 2001 also performs a control for transmitting an instruction of changing the image pickup direction of the image pickup apparatus 1000 to the image pickup apparatus 1000 via the communication unit 2004. The control unit 2001 thus performs the control to change the image pickup direction of the image pickup apparatus 1000.

The storage unit 2002 temporarily saves the picked-up image received by the communication unit 2004 which will be described below or the output data output from the control unit 2001. The storage unit 2002 records a program to be executed by the processor in a case where the control unit 2001 includes a built-in processor such as a CPU.

The storage unit 2002 is used for temporarily saving parameters used when the processor executes the program. The storage unit 2002 also stores a communication parameter for the communication unit 2004 which will be described below to perform a communication with the reception apparatus. The communication parameter includes, for example, an IP address of the reception apparatus or the like.

The storage unit 2002 may also be composed as plural different storage media. The storage unit 2002 is composed, for example, of a random access memory (RAM), a read only memory (ROM), or the like. Removable media may also be used as the storage unit 2002. The storage unit 2002 may also be composed of an external storage apparatus such as a memory card.

A display unit 2003 displays the picked-up image received from the image pickup apparatus 1000. The display unit 2003 displays a user interface which will be described below by using FIG. 15A, FIG. 15B, and FIG. 15C. The user can specify the parameter for setting the superposition information superposed on the image picked up by the image pickup apparatus 1000 by using this user interface.

The obtaining unit 2005 is configured to input an instruction from the user. For example, the obtaining unit 2005 inputs the parameter for setting the superposition information specified by the user by using the user interface which will be described below by using FIG. 15A, FIG. 15B, and FIG. 15C. The obtaining unit 2005 obtains a first command for instructing to perform the superposition of the superposition information in the first superposition mode for superposing the superposition information on the predetermined position on the display screen of the picked-up image. The obtaining unit 2005 also obtains a second command for instructing to perform the superposition of the superposition information in the second superposition mode for superposing the superposition information in the predetermined range of the picked-up image while tracking the change in the picked-up image displayed on the display screen.

The communication unit 2004 transmits the parameter for setting the superposition information to the image pickup apparatus 1000. The communication unit 2004 changes the parameter to be transmitted between a case where the first command is obtained and a case where the second command is obtained and transmits the parameter to the image pickup apparatus 1000. The first superposition mode for superposing the superposition information on the predetermined position on the display screen of the picked-up image and the second superposition mode for superposing the superposition information in the predetermined range of the picked-up image while tracking the change in the picked-up image displayed on the display screen are set as described above. Alternatively, the first superposition mode for superposing the superposition information on the predetermined position on the display screen of the picked-up image and the second superposition mode for superposing the superposition information on the image pickup range of the image pickup unit or the area on the display screen in accordance with the change in the picked-up image are set.

The communication unit 2004 transmits an instruction of superposing the superposition information set in accordance with the specified parameter on the picked-up image to the image pickup apparatus 1000. The communication unit 2004 receives the image picked up by the image pickup apparatus 1000. Alternatively, the communication unit 2004 receives an image obtained by superposing the superposition information on the image picked up by the image pickup apparatus 1000 from the image pickup apparatus 1000.

Figure 3:
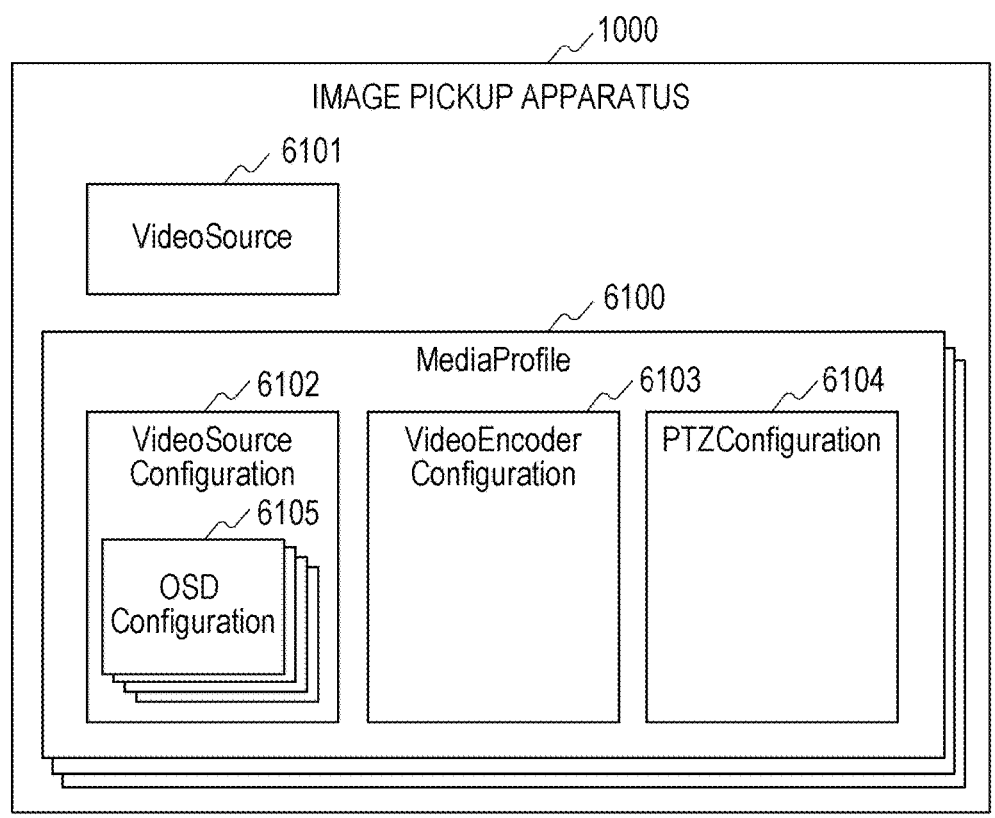
FIG. 3 illustrates parameters held by the image pickup apparatus according to the first embodiment.

Next, the commands and parameters used according to the present embodiment will be described. FIG. 3 illustrates a structure of the parameters held by the image pickup apparatus 1000 according to the present embodiment.

A MediaProfile 6100 is a parameter set for storing various setting items of the image pickup apparatus 1000 to be associated with each other. The MediaProfile 6100 includes ProfileToken serving as identification information for identifying the MediaProfile 6100. The MediaProfile 6100 also includes a VideoSourceConfiguration 6102, a VideoEncoderConfiguration 6103, and a PTZConfiguration 6104 which will be described below. The MediaProfile 6100 further holds links to the various setting items including a distribution image encoder or an audio encoder.

A VideoSource 6101 is an assembly of parameters indicating a performance of the image pickup sensor provided to the image pickup apparatus 1000. The VideoSource 6101 includes VideoSourceToken serving as identification information for identifying the VideoSource 6101 and Resolution indicating a resolution of the image data that can be output by the image pickup sensor.

The VideoSourceConfiguration 6102 is an assembly of parameters for associating the VideoSource 6101 provided to the image pickup apparatus 1000 with the MediaProfile 6100. The VideoSourceConfiguration 6102 includes Bounds for specifying which part of the image data output by the VideoSource 6101 is cut out to be generated as a distribution image. A detail of the Bounds will be described below by using FIG. 5A and FIG. 5B.

The VideoEncoderConfiguration 6103 is an assembly of parameters for associating a setting related to video compression with the MediaProfile 6100. The image pickup apparatus 1000 performs image processing on the image data that is output on the basis of the content of the VideoSourceConfiguration 6102. In a case where the image processing is conducted, the image pickup apparatus 1000 performs the image processing in accordance with a video compression system set in the VideoEncoderConfiguration 6103 (for example, JPEG or H.264), a frame rate, a resolution, or the like. The image on which the image processing has been conducted in accordance with the content of the VideoEncoderConfiguration 6103 is then distributed to the reception apparatus 2000.

The PTZConfiguration 6104 is an assembly of parameters for associating settings related to the pan mechanism 1101, the tilt mechanism 1102, and the zoom mechanism 1103 of the image pickup apparatus 1000 with the MediaProfile 6100. The PTZConfiguration 6104 includes information related to a coordinate system representing the actual pan and tilt angle values and the zoom magnification factor.

An OSDConfiguration 6105 is an assembly of parameters for holding a list of parameters related to the on-screen display (OSD).

The OSDConfiguration 6105 includes OSDType indicating a type of the OSD. According to the present embodiment, the types of the OSD include a TEXT type for superposing text information as the superposition information and an IMAGE type for superposing image information as the superposition information.

The OSDConfiguration 6105 also includes OSDPosConfiguration for specifying a display position of the OSD.

The OSDConfiguration 6105 also includes OSDTextConfiguration for setting a detailed parameter of the OSD in a case where the OSDType is the TEXT.

The OSDConfiguration 6105 also includes OSDImgConfiguration for setting a detailed parameter of the OSD in a case where the OSDType is the IMAGE.

The OSDType is a parameter for specifying the type of the OSD, and the TEXT for displaying text string information or the IMAGE for displaying an image can be selected.

The OSDPosConfiguration is a parameter for specifying a position of the displayed OSD, the upper left, the lower left, the upper right, the lower right, or a custom of the distributed image is selected and specified (Type specification). In a case where the custom is selected by the Type specification, Pos that also specifies an arbitrary position on the distributed image by using a normalized coordinate which will be described below can be specified for the OSDPosConfiguration.

The OSDTextConfiguration is a parameter for setting a detail of the text string information displayed as the OSD. With regard to the OSDTextConfiguration, a date, a time, and an arbitrary text string can respectively be specified as DATE, TIME, and PLAIN (Type specification).

The OSDTextConfiguration includes PlainText that specifies an arbitrary text string displayed as the OSD in a case where PLAIN is specified by the Type specification. The OSDTextConfiguration also includes FontSize that specifies a size of the displayed text string in a case where PLAIN is specified by the Type specification. The OSDTextConfiguration further includes FontColor and BackgroundColor that specify colors of the displayed text string and the background in a case where PLAIN is specified by the Type specification. The OSDTextConfiguration further includes BoxSize that specifies a size of the area for displaying the text string in a case where PLAIN is specified by the Type specification.

The OSDImgConfiguration is a parameter for setting a detail of the image information displayed as the OSD and includes ImgPath that specifies an address of an image file.

Figure 4:
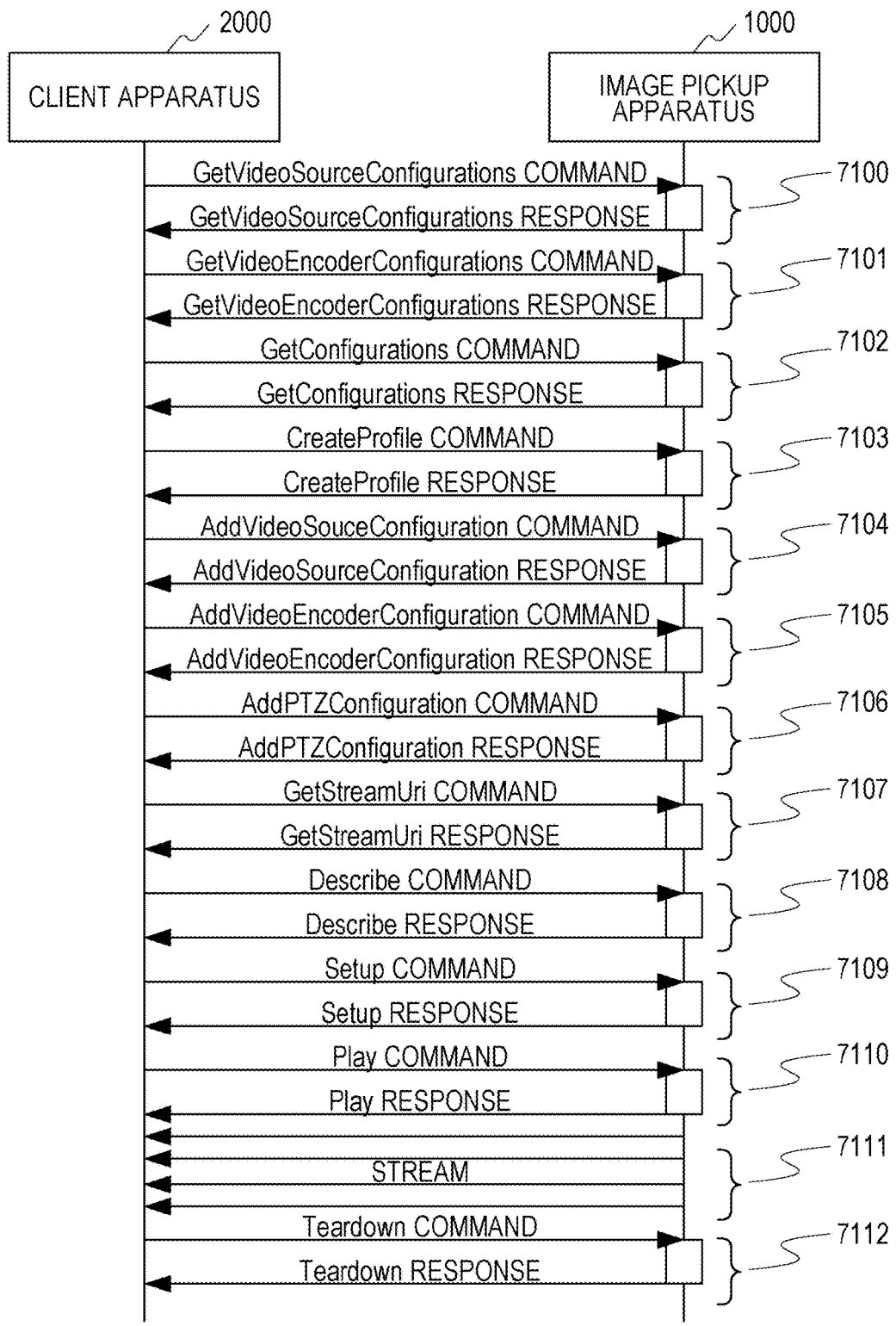
FIG. 4 illustrates a command sequence of the image pickup system according to the first embodiment.

Next, between the image pickup apparatus 1000 and the reception apparatus 2000, FIG. 4 illustrates an example of a command sequence from a setting start until a video distribution.

A transaction 7100 is a transaction of a GetVideoSourceConfigurations command. With this command, the reception apparatus 2000 obtains the list of the VideoSourceConfiguration 6102 held by the image pickup apparatus 1000.

A transaction 7101 is a transaction of a GetVideoEncoderConfigurations command. With this command, the reception apparatus 2000 obtains a list of the VideoEncoderConfiguration 6103 held by the image pickup apparatus 1000.

A transaction 7102 is a transaction of a GetConfigurations command. With this command, the reception apparatus 2000 obtains a list of the PTZConfiguration 6104 held by the image pickup apparatus 1000.

A transaction 7103 is a transaction of a CreateProfile command. With this command, the reception apparatus 2000 newly creates the MediaProfile 6100 in the image pickup apparatus 1000 and obtains the ProfileToken.

A transaction 7104 is a transaction of an AddVideoSourceConfiguration command. With this command, the reception apparatus 2000 can associate the desired VideoSourceConfiguration with the specified MediaProfile.

A transaction 7105 is a transaction of an AddVideoEncoderConfiguration command. With this command, the reception apparatus 2000 can associate the desired VideoEncoderConfiguration with the specified MediaProfile.

A transaction 7106 is a transaction of an AddPTZConfiguration command. With this command, the reception apparatus 2000 can associate the specified PTZConfiguration with the MediaProfile.

A transaction 7107 is a transaction of a GetStreamUri command. With this command, the reception apparatus 2000 obtains an address (uniform resource identifier (URI)) for the image pickup apparatus 1000 to obtain the distribution stream on the basis of the setting on the specified MediaProfile.

A transaction 7108 is a transaction of a Describe command. The reception apparatus 2000 requests and obtains information of the content sent through the stream distribution by the image pickup apparatus 1000 by executing this command by using the URI obtained in the transaction 7107.

A transaction 7109 is a transaction of a Setup command. A transmission method of the stream including a session number is shared between the reception apparatus 2000 and the image pickup apparatus 1000 by executing this command by using the URI obtained in the transaction 7107.

A transaction 7110 is a transaction of a Play command. The reception apparatus 2000 requests the image pickup apparatus 1000 to start a stream by executing this command by using the session number obtained in the transaction 7109.

The image pickup apparatus 1000 distributes a stream 7111 the start of which is requested in the transaction 7110 through the transmission method shared in the transaction 7109.

A transaction 7112 is a transaction of a Teardown command. The reception apparatus 2000 requests the image pickup apparatus 1000 to stop the stream by executing this command by using the session number obtained in the transaction 7109.

Figure 5A:
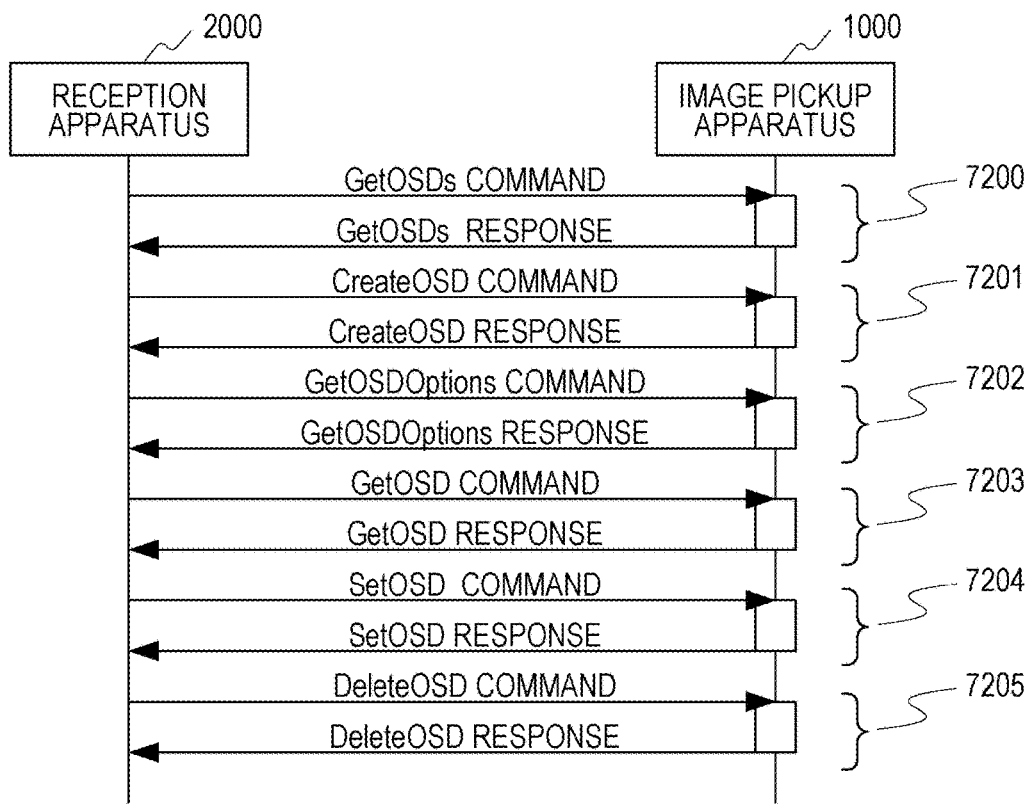
FIG. 5A illustrates an OSD command sequence of the image pickup system.

FIG. 5A illustrates an example of a command sequence for the OSD setting between the image pickup apparatus 1000 and the reception apparatus 2000.

A transaction 7200 is a transaction of a GetOSDs command. The GetOSDs command is a command for instructing to return all the OSDConfigurations 6105 associated with the specified VideoSourceConfiguration 6102. This command is conducted by the reception apparatus 2000 with respect to the image pickup apparatus 1000.

A transaction 7201 is a transaction of a CreateOSD command. The CreateOSD command is a command for instructing that the OSDConfiguration 6105 is newly created by being associated with the specified VideoSourceConfiguration 6102. This command is conducted by the reception apparatus 2000 with respect to the image pickup apparatus 1000. The image pickup apparatus 1000 returns OSDToken corresponding to an ID of the generated OSD to the reception apparatus 2000 by the execution of the CreateOSD command.

A transaction 7202 is a transaction of a GetOSDOptions command. The GetOSDOptions command is a command for instructing to return selection ranges of the respective parameters of the OSDConfiguration 6105 that can be set by a SetOSD command which will be described below or options. This command is conducted by the reception apparatus 2000 with respect to the image pickup apparatus 1000.

A transaction 7203 is a transaction of a GetOSD command. The GetOSD command is a command conducted by the reception apparatus 2000 to instruct the image pickup apparatus 1000 to return the OSDConfiguration 6105 having the specified OSDToken.

A transaction 7204 is a transaction of a SetOSD command. The SetOSD command is a command conducted by the reception apparatus 2000 to instruct the image pickup apparatus 1000 to edit the respective parameters included in the OSDConfiguration 6105. The image pickup apparatus 1000 executes the content of the OSDConfiguration 6105 having the OSDToken specified by the reception apparatus 2000 by the execution of the SetOSD command. According to this, the image pickup apparatus 1000 newly displays the OSD or changes the color, the size, or the position of the currently displayed OSD. A detail of the processing based on this command in the image pickup apparatus 1000 will be described below.

A transaction 7205 is a transaction of a DeleteOSD command. The DeleteOSD command is a command for instructing the deletion of the OSDConfiguration 6105 created by the CreateOSD command. This command is conducted by the reception apparatus 2000 with respect to the image pickup apparatus 1000. The image pickup apparatus 1000 deletes OSDConfiguration 6105 having the OSDToken specified by the reception apparatus 2000 from the storage apparatus by the execution of the DeleteOSD command.

Next, a relationship between the superposition display position of the OSD and the coordinate in the image pickup apparatus 1000 will be described by using FIG. 6 and FIG. 7A and FIG. 7B.

Figure 6:
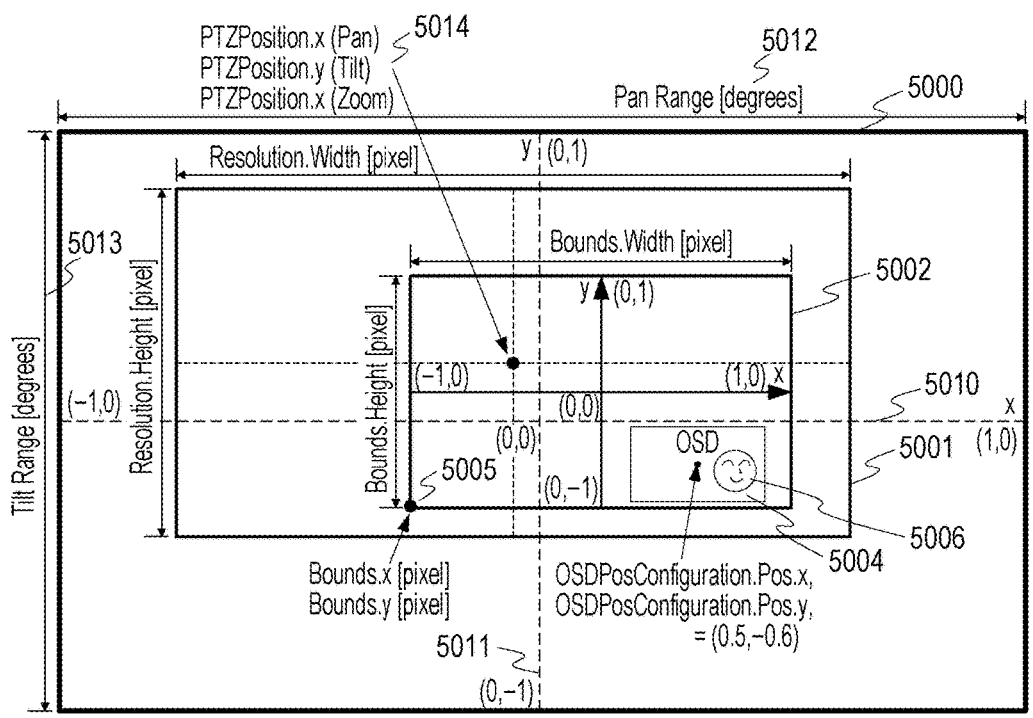
FIG. 6 illustrates a relationship between an image pickup available range and an OSD superposition position according to the first embodiment.

In FIG. 6, a pan range 5012 and a tilt range 5013 respectively indicate a full movable range of the pan mechanism 1101 and a full movable range of the tilt mechanism 1102. The image pickup available range 5000 indicates an image pickup available range while the image pickup unit 1003 drives the pan mechanism 1101, the tilt mechanism 1102, or the zoom mechanism 1103.

Image data 5001 indicates image data output by the image pickup unit 1003 at a certain zoom magnification. A distribution image 5002 indicates a distribution image specified by the Bounds included in the VideoSourceConfiguration 6102. An OSD 5004 is an OSD specified by the OSDConfiguration 6105. A subject 5006 is a subject in the distribution image 5002.

The Bounds includes parameters indicating a cutout position in the image data 5001. That is, the Bounds includes parameters of a horizontal direction position (x) and a vertical direction position (y) that specify an apex of the lower left of the distribution image 5002 byway of pixels and parameters of a horizontal direction size (Width) and a vertical direction size (Height) that specify a size of the distribution image by way of pixels.

According to the present embodiment, the position of the OSD 5004 is specified by a normalized coordinate system where the distribution image 5002 cut out by the Bounds is normalized in both the horizontal direction (x) and the direction (y) to −1.0 to +1.0. A center point of the OSD 5004 in this normalized coordinate system is specified by the OSDPosConfiguration.

In the example of FIG. 6, the display position of the OSD 5004 is specified as (x, y)=(0.5, −0.6) in the distribution image 5002. The display size of the OSD 5004 is decided by the BoxSize included in the OSDTextConfiguration.

A center point 5014 is a center point of the image data 5001 output by the image pickup unit 1003 which is specified by the PTZPosition and is represented by a coordination system specified by the PTZConfiguration 6104. According to the present embodiment, this coordination system is set as normalized coordinate system where the full range of the pan mechanism and the full range of the tilt mechanism are normalized to −1.0 to +1.0 in both a horizontal direction (x) 5010 and a vertical direction (y) 5011.

Figure 7A:
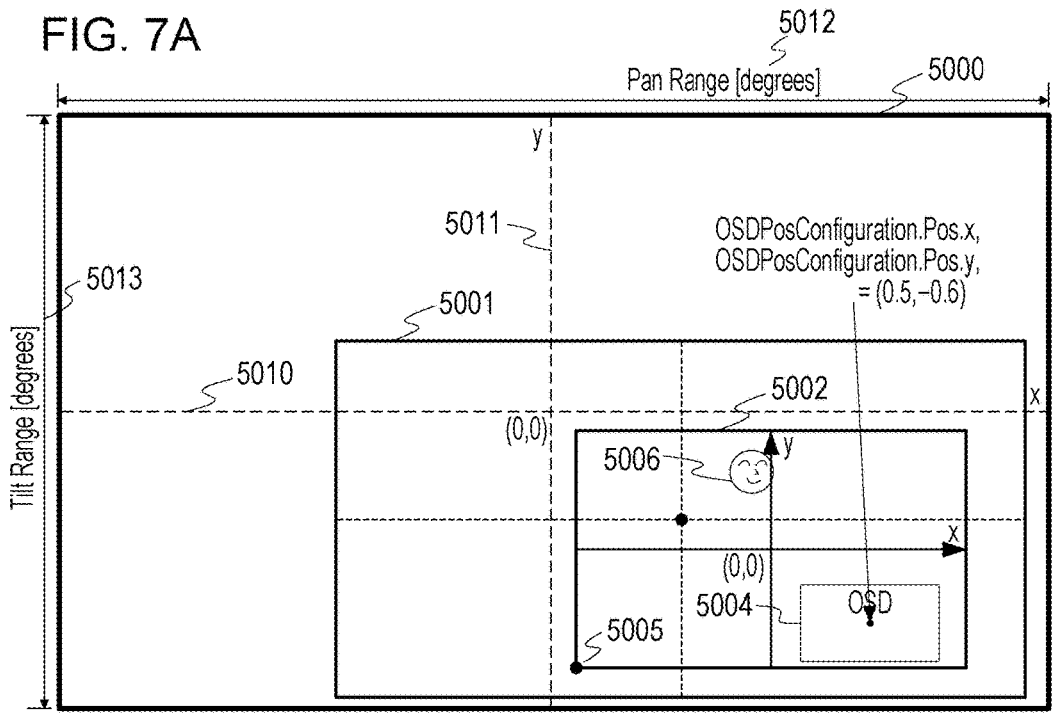
FIG. 7A illustrates a relationship between the image pickup available range and the OSD superposition position when the image pickup direction is changed in a first superposition mode.

FIG. 7A illustrates a superposition position of the OSD 5004 when the position of the image data 5001 on the image pickup available range 5000 of the image pickup unit 1003 is moved from the position illustrated in FIG. 6 in a case where the OSD 5004 is in the first superposition mode. The movement of the position of the image data 5001 is caused, for example, by the change in the image pickup direction of the image pickup unit 1003 based on the drive of the pan mechanism 1101 or the tilt mechanism 1102. The display position of the OSD 5004 on a distribution image 5005 is kept at the same position in the first superposition mode. In other words, the display position of the OSD 5004 on the image pickup available range 5000 is changed in accordance with the change in the image pickup direction in the first superposition mode.

Figure 7B:
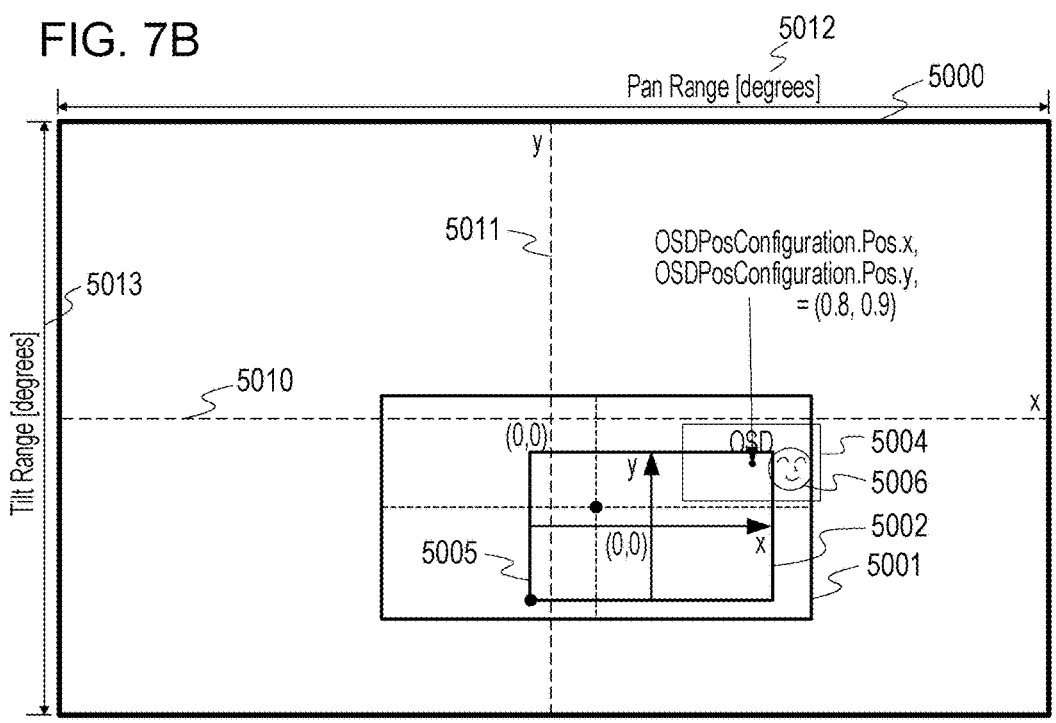
FIG. 7B illustrates a relationship between the image pickup available range and the OSD superposition position when the image pickup direction is changed in a second superposition mode.

FIG. 7B illustrates a superposition position of the OSD 5004 when the position of the image data 5001 on the image pickup available range 5000 is moved from the position illustrated in FIG. 6 in a case where the OSD 5004 is in the second superposition mode. The movement of the position of the image data 5001 is caused, for example, by the change in the image pickup direction of the image pickup unit 1003 based on the drive of the pan mechanism 1101 or the tilt mechanism 1102. The superposition position of the OSD 5004 on the distribution image 5005 is changed in accordance with the change in the image pickup direction of the image pickup unit 1003 in the second superposition mode. In the example of FIG. 7B, the superposition is conducted in a manner that the position of the OSD 5004 on the image pickup available range 5000 is kept.

Figure 10A:
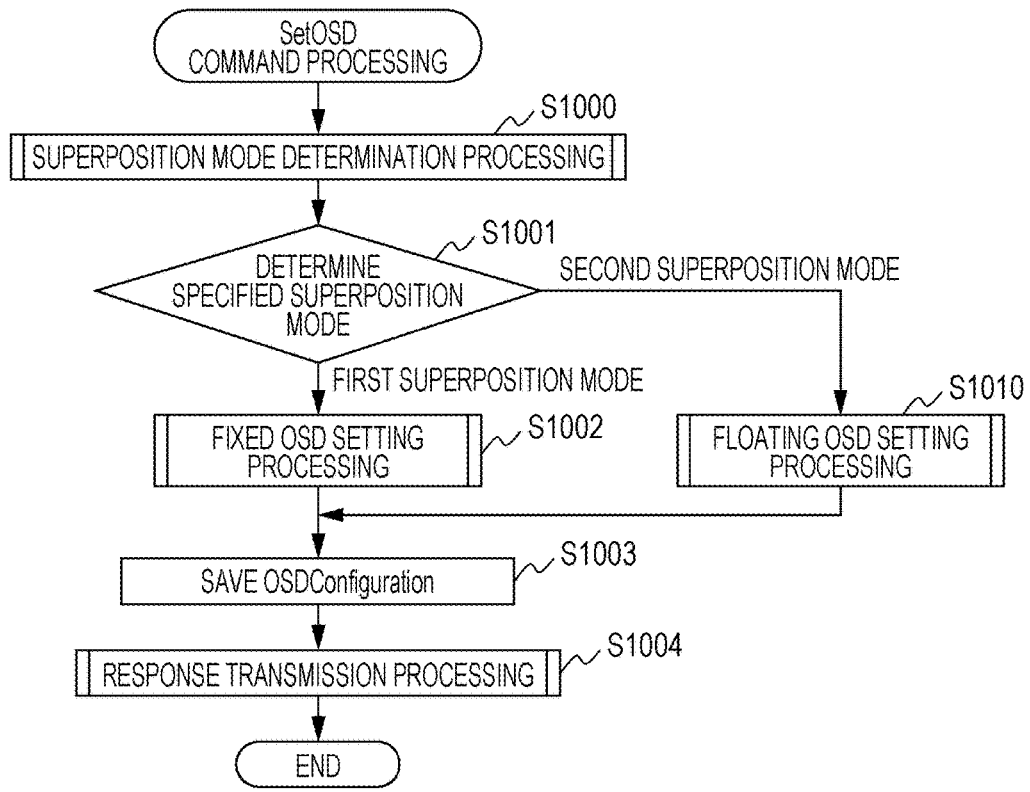
FIG. 10A illustrates a flow of OSD setting processing according to the first embodiment.
Figure 10B:
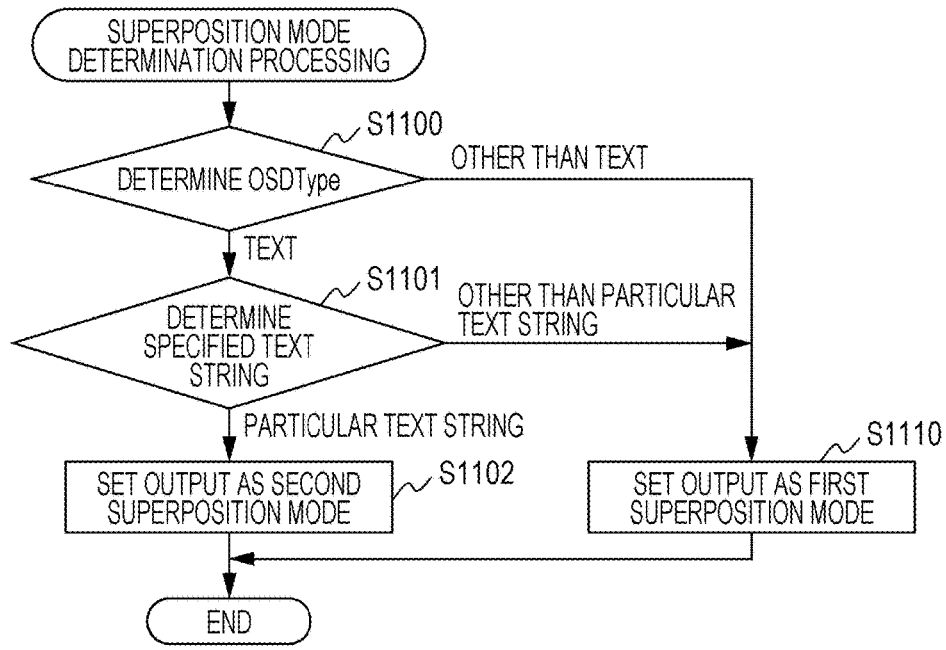
FIG. 10B illustrates a flow of superposition mode determination processing according to the first embodiment.

Next, processing in a case where the image pickup apparatus 1000 receives the above-described SetOSD command from the reception apparatus 2000 will be described by using FIG. 10A and FIG. 10B. The process flows of FIG. 10A and FIG. 10B represent the programs for causing the control unit 1001 to execute the procedures illustrated in FIG. 10A and FIG. 10B in a mode where the control unit 1001 of the image pickup apparatus 1000 includes a built-in processor. The processor built in the control unit 1001 of the image pickup apparatus 1000 is a computer and executes the program read out from the storage unit 1002 built in the image pickup apparatus 1000.

First, the control unit 1001 executes superposition mode determination processing which will be described below (S1000). The superposition mode determination processing determines whether the content of the OSDConfiguration specified in the SetOSD command is the first superposition mode or the second superposition mode.

The first superposition mode refers to a superposition mode for superposing the superposition information on the predetermined position on the display screen of the picked-up image. That is, the superposition information is superposed on the picked-up image in a manner that the position of the superposition information on the display screen of the picked-up image is not changed in the first superposition mode. For example, the superposition position of the OSD on the image data is not changed without tracking the change in the image data in the first superposition mode. According to the present embodiment, for example, the first superposition mode is a fixed OSD mode.

The second superposition mode refers to a superposition mode for superposing the superposition information on a predetermined range of the picked-up image while tracking the change in the picked-up image displayed on the display screen. In the second superposition mode, the superposition information is superposed on the image pickup range of the image pickup unit the area on the display screen in accordance with the change in the picked-up image. The superposition information is superposed on the picked-up image in a manner that the position of the superposition information on the display screen of the picked-up image is changed in accordance with the position of the predetermined subject in the picked-up image in the second superposition mode. For example, in the second superposition mode, the superposition position of the OSD on the image data is changed in accordance with the change in the image data. According to the present embodiment, for example, the second superposition mode is a floating OSD mode.

In step S1001, the control unit 1001 shifts the processing to step S1002 in a case where the content of the OSDConfiguration is the first superposition mode and shifts the processing to step S1010 in a case where the content is the second superposition mode.

In step S1002, the control unit 1001 executes the fixed OSD setting processing which will be described below. After the execution, the control unit 1001 shifts the processing to step S1003.

In step S1010, the control unit 1001 executes the floating OSD setting processing which will be described below. After the execution, the control unit 1001 shifts the processing to step S1003.

In step S1003, the control unit 1001 saves the OSDConfiguration together with the OSDToken in the storage unit 1002.

In step S1004, the control unit 1001 executes response transmission processing of returning a response with respect to the SetOSD command to the reception apparatus 2000.

A detail of the superposition mode determination processing in step S1001 of FIG. 10A will be described by using FIG. 10B.

In step S1100, the control unit 1001 determines whether or not the parameter for setting the superposition information received from the reception apparatus 2000 includes a parameter indicating that the text information is superposed as the superposition information. According to the present embodiment, the control unit 1001 determines whether the OSDType of the input OSDConfiguration is the TEXT. In a case where the OSDType is the TEXT, it is determined that the text information is set as the superposition information. In a case where the OSDType is other than the TEXT, it is determined that information other than the text information is set as the superposition information, and the control unit 1001 shifts the processing to S1110.

In step S1101, the control unit 1001 determines whether or not the text string specified as the OSD is the predetermined specified text string. This text string functions as a parameter for specifying a type of the text information superposed as the superposition information. In case of the specified text string, the control unit 1001 shifts the processing to S1102 to set the output as the second superposition mode and ends the superposition mode determination processing. In a case where the parameter for setting the superposition information is a parameter for specifying the text information of the particular type as the superposition information, the superposition of the superposition information can be conducted in the second superposition mode (floating OSD mode) as described above.

On the other hand, in a case where the text string is other than the specified text string, the control unit 1001 shifts the processing to S1110 to set the output as the first superposition mode and ends the superposition mode determination processing. In a case where the parameter for setting the superposition information is a parameter for specifying the text information of a type other than the particular type as the superposition information, the superposition of the superposition information can be conducted in the first superposition mode (fixed OSD mode) as described above.

The case where the text string is the specified text string according to the present embodiment refers to a case where the PlainText included in the OSDTextConfiguration is blank but is not limited to this. For example, a case where the OSDTextConfiguration satisfies the following other conditions may also be employed. That is, the case where the text string is the specified text string can include a case where the PlainText is blank while OSDType=TEXT and also OSDTextConfiguration.Type=PLAIN.

Alternatively, the specified text string may include a case where the superposition mode is a control code indicating the first superposition mode, for example, "#FLOATING" or the like is specified for the PlainText. A specification of a color other than transparent as the BackgroundColor included in OSDTextConfiguration may further be added for an additional condition for the determination as the first superposition mode.

Figure 11A:
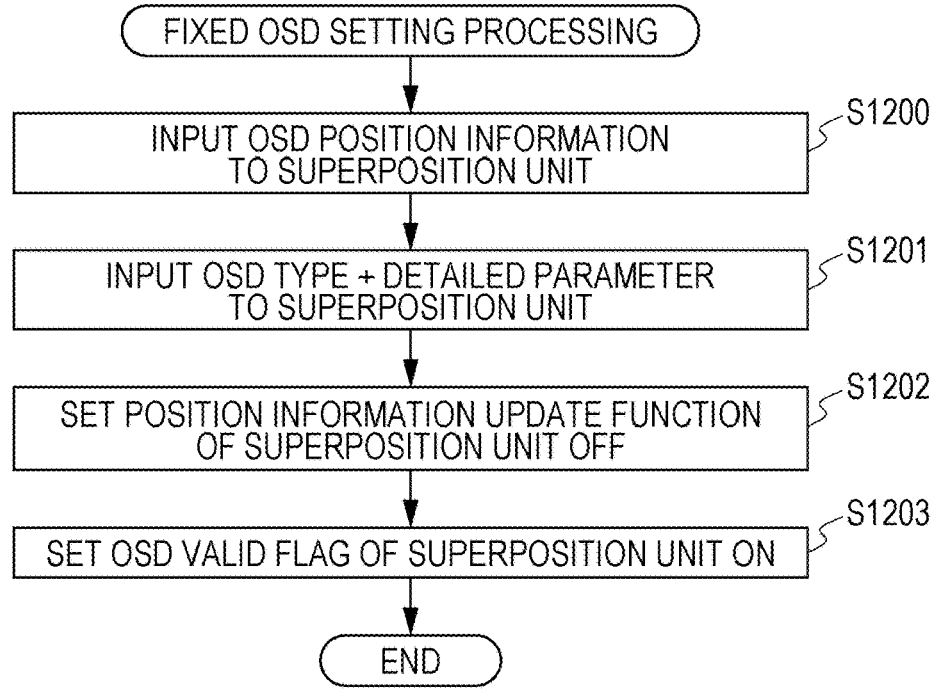
FIG. 11A illustrates a flow of fixed OSD setting processing.
Figure 11B:
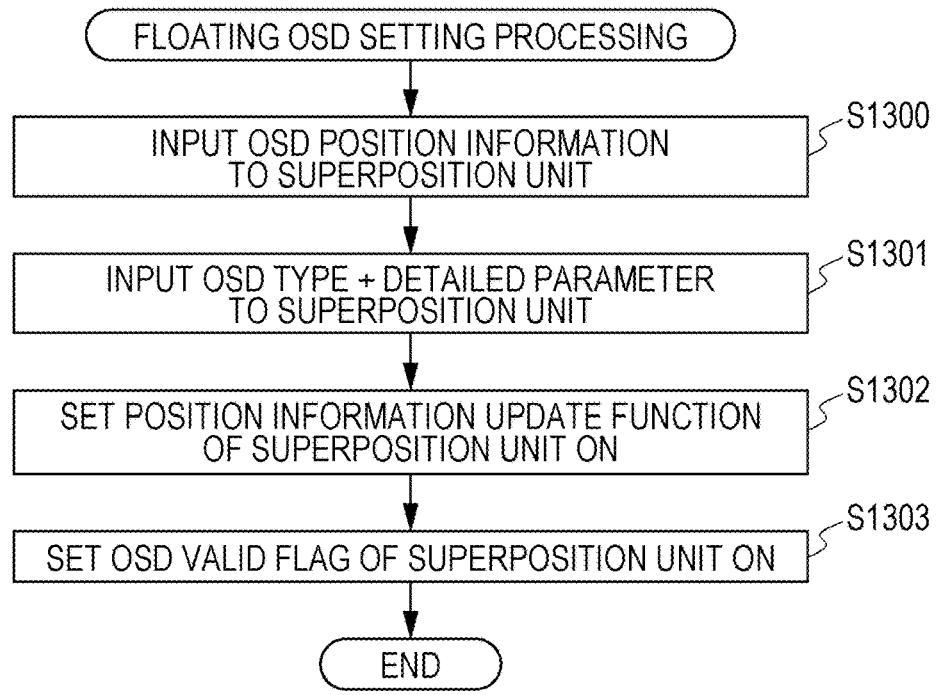
FIG. 11B illustrates a flow of a floating OSD setting processing.

Next, details of the fixed OSD setting processing (S1002) and the floating OSD setting processing (S1010) of FIG. 10A will be described by using FIG. 11A and FIG. 11B. In the mode where the control unit 1001 of the image pickup apparatus 1000 includes the built-in processor, the processing flows of FIG. 11A and FIG. 11B represent the program for causing the control unit 1001 to execute the procedures illustrated in FIG. 11A and FIG. 11B. The processor built in the control unit 1001 of the image pickup apparatus 1000 is a computer and executes the program read out from the storage unit 1002 built in the image pickup apparatus 1000.

First, a detail of the fixed OSD setting processing (S1002) will be described by using FIG. 11A.

In step S1200, the control unit 1001 inputs the input position information of the OSD included in the OSDConfiguration, that is, the setting content of the OSDPosConfiguration to the superposition unit 1006.

In step S1201, the control unit 1001 inputs the content of the OSDTextConfiguration or the OSDImgConfiguration to the superposition unit 1006 in accordance with the type of the OSD included in the input OSDConfiguration. That is, the OSD type is the content of the OSDType.

In step S1202, the control unit 1001 sets the position information update function of the superposition unit 1006 as OFF. That is, the control unit 1001 sets the superposition mode of the superposition unit 1006 as the mode for fixing the superposition position of the superposition information on the display screen of the picked-up image.

In step S1203, the control unit 1001 sets the OSD valid flag of the superposition unit 1006 as ON. According to this, the superposition processing of the OSD on the distribution image 5002 is started.

Next, a detail of the floating OSD setting processing (S1010) will be described by using FIG. 11B.

In step S1300, the control unit 1001 inputs the position information of the OSD included in the input OSDConfiguration, that is, the setting content of the OSDPosConfiguration to the superposition unit 1006.

In step S1301, the control unit 1001 inputs the content of the OSDTextConfiguration or the OSDImgConfiguration to the superposition unit 1006 in accordance with the type of the OSD included in the in put OSDConfiguration. That is, the OSD type is the content of the OSDType.

In step S1302, the control unit 1001 sets the superposition mode of the superposition unit 1006 as the mode where the superposition position of the superposition information on the display screen of the picked-up image is variable. That is, the position of the OSD on the display screen of the picked-up image is moved along with the movement of the subject position on the display screen of the picked-up image.

In step S1303, the control unit 1001 sets the OSD valid flag of the superposition unit 1006 as ON. According to this, the superposition processing of the OSD on the distribution image 5002 is started.

Figure 12:
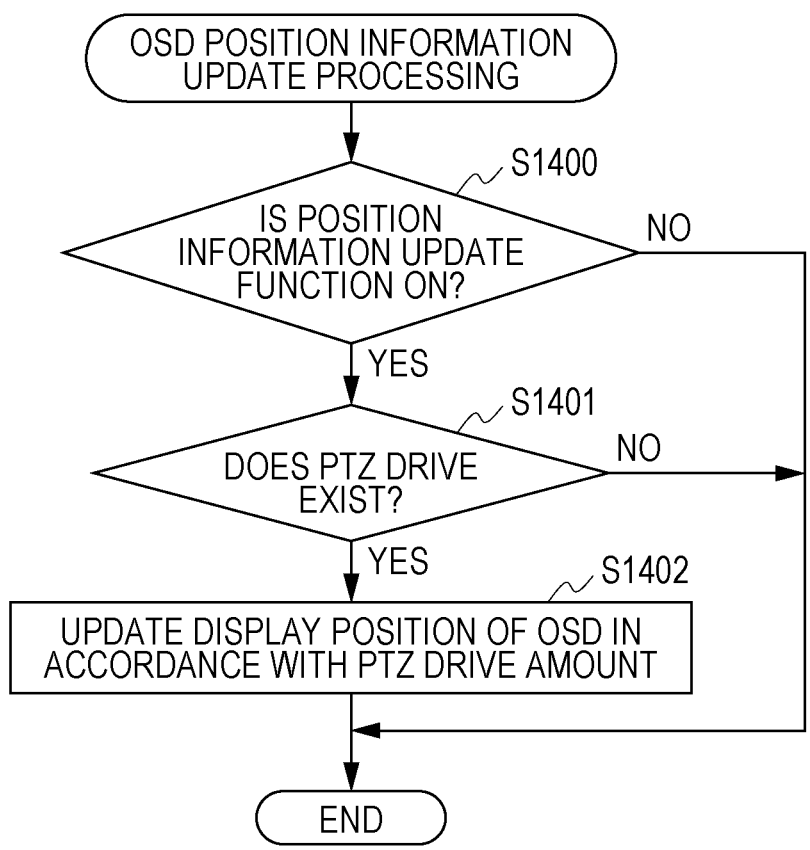
FIG. 12 illustrates a flow of OSD position information update processing according to the first embodiment.

Next, the OSD position information update processing will be described by using FIG. 12. The present processing will be described as processing to be executed by the processor independent from the control unit 1001 included in the superposition unit 1006. In the mode where the superposition unit 1006 includes the built-in processor, the process flow of FIG. 12 represents a program for causing the processor of the superposition unit 1006 to execute the procedure illustrated in FIG. 12. The processor built in the superposition unit 1006 is a computer and executes the program read out from the storage unit 1002 built in the image pickup apparatus 1000.

Alternatively, the control unit 1001 may execute the OSD position information update processing. In the mode where the control unit 1001 of the image pickup apparatus 1000 includes the built-in processor, the processing flow of FIG. 12 represents the program for causing the control unit 1001 to execute the procedures illustrated in FIG. 12. The processor built in the control unit 1001 of the image pickup apparatus 1000 is a computer and executes the program read out from the storage unit 1002 built in the image pickup apparatus 1000.

In step S1400, the superposition unit 1006 determines whether or not the position information update function is OFF. In a case where the position information update function is OFF (a case where the superposition information is superposed at a fixed position on the display screen of the picked-up image), the present processing is ended.

On the other hand, in step S1400, when it is determined that the position information update function is on (the position of the superposition information on the display screen of the picked-up image is variable), the superposition unit 1006 performs the processing in step S1401.

In step S1401, the superposition unit 1006 determines whether or not a change occurs in the current pan angle value, the current tilt angle value, and the current zoom magnification value output from the image pickup control unit 1005, that is, the image data 5001. In a case where no change occurs, the present processing is ended. On the other hand, in a case where the change occurs, for example, a case where a change from the image data 5001 of FIG. 5A to the image data 5001 of FIG. 5B occurs, the superposition unit 1006 shifts the processing to step S1402.

In step S1402, the superposition unit 1006 recalculates the position and the size of the OSD on the basis of the changed pan angle value, tilt angle value, and zoom magnification value and updates the OSD that is currently superposed and displayed on the distribution image 5002. Upon the recalculation of the position and the size of the OSD, the position and the size of the OSD superposed and displayed are calculated so as to be identical to the image pickup available range 5000.

Figure 15B:
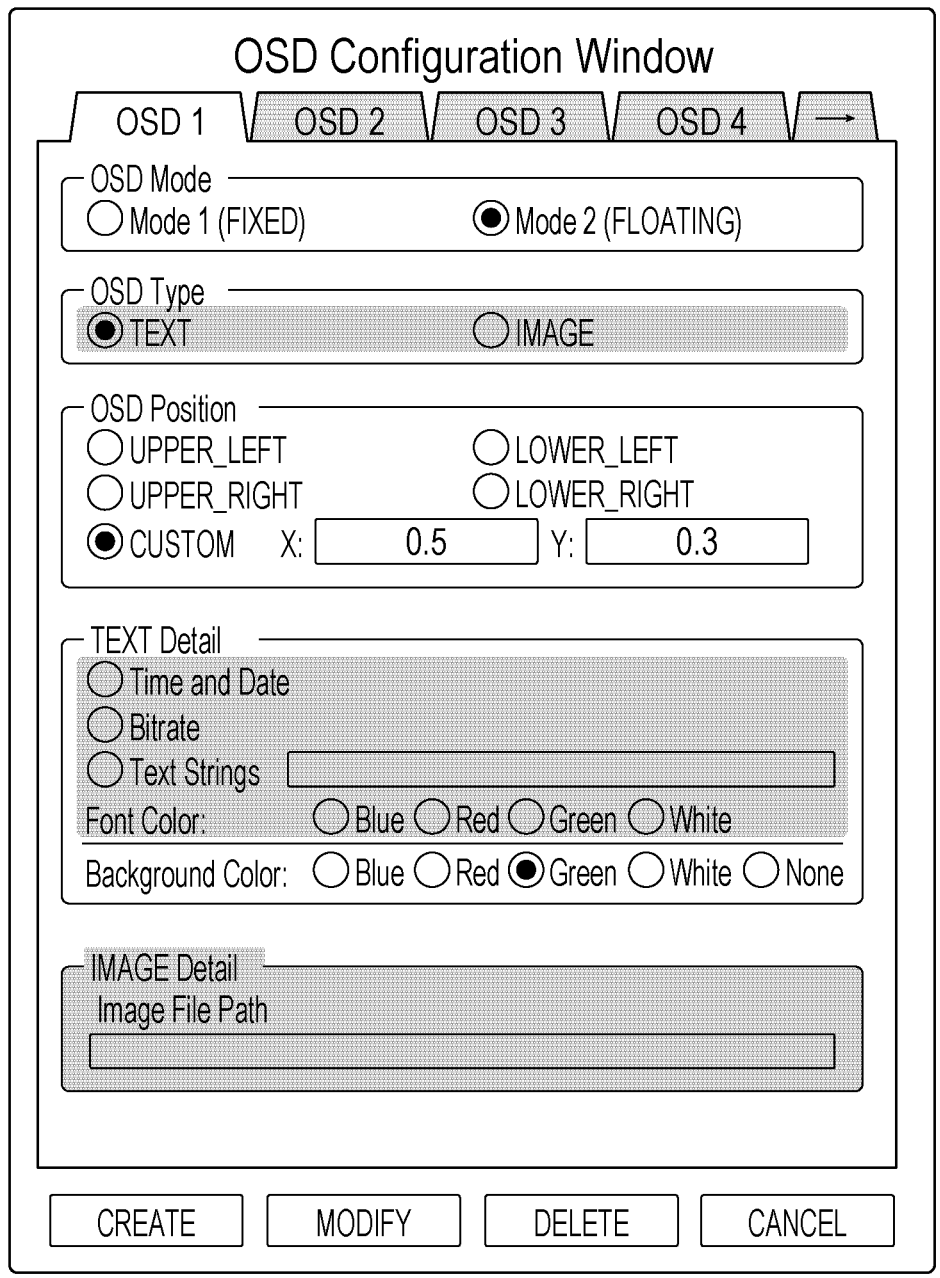
FIG. 15B illustrates a second example of the user interface for setting the superposition information.

Next, FIG. 15A and FIG. 15B illustrate examples of the screen of the user interface for the OSD setting in the reception apparatus 2000.

FIG. 15A illustrates the user interface for the user to perform a setting of superposing the OSD in the first superposition mode (fixed OSD mode) with respect to the image pickup apparatus 1000 in the reception apparatus 2000.

An OSD Mode 7000 is a part where the superposition mode is selected. The reception apparatus 2000 sets parameters of the superposition mode to perform the superposition of the superposition information in the selected superposition mode. According to the present embodiment, the superposition modes include the fixed OSD mode and the floating OSD mode described above. In the example of FIG. 15A, Model, that is, the first superposition mode (fixed OSD mode) is selected.

An OSD Type 7001 is a part where a type of the OSD to be superposed and displayed, that is, the OSDType is selected. The reception apparatus 2000 transmits the parameter for superposing the OSD of the selected type on the picked-up image to the image pickup apparatus 1000 in a case where a Create button or a Modify button which will be described below is pressed. According to the present embodiment, the superposition of the text information or the superposition of the image information can be selected for the type of the OSD. In the example of FIG. 15A, since TEXT is selected, TEXT Detail 7003 corresponding to a detailed setting of the superposed text is validated, and IMAGE Detail 7004 corresponding to a detailed setting of the superposed image is invalidated.

An OSD Position 7002 is a part where the display position of the OSD on the picked-up image is specified. UPPER_LEFT (the upper left on the screen), UPPER_RIGHT (the upper right on the screen), LOWER_LEFT (the lower left on the screen), LOWER_RIGHT (the lower right on the screen), and CUSTOM (coordinate specification) can be selected, and in FIG. 15A, UPPER_LEFT is selected. The reception apparatus 2000 transmits the parameter for superposing the superposition information at the selected display position to the image pickup apparatus 1000 in a case where the Create button or the Modify button which will be described below is pressed.

A Text Detail 7003 is a part where detailed data is set in case of the OSDType=TEXT. Time and Date, Bitrate, and Text String can be selected for the type of TEXT. In case of Text String, an arbitrary text string can be selected by a text input box. Time and Date is selected in FIG. 15A. The reception apparatus 2000 transmits the parameter for superposing the text information of the selected type on the picked-up image in a case where the Create button or the Modify button which will be described below is pressed to the image pickup apparatus 1000.

The IMAGE Detail 7004 is a part where detailed data is set in case of the OSDType=IMAGE. An address of an image file displayed as the OSD is set in a text input box of Image File Path. The address of the image file can specify the image file stored in the storage unit 1002 of the image pickup apparatus 1000. The image file stored in the storage unit 1002 may be an image file previously held by the image pickup apparatus 1000. Alternatively, the image file may be an image file loaded onto the storage unit 1002 from an external part of the image pickup apparatus 1000.

Alternatively, the address of the image file can specify an image file stored in another storage apparatus connected to the image pickup apparatus 1000 via a network.

Alternatively, the address input to the Image File Path may not specify the image file stored in the storage unit inside or outside of the image pickup apparatus 1000. That is, an address for distinguishing the superposition mode such as the fixed OSD mode or the floating OSD mode instead of specifying the actual image file may be input. In a case where the address indicating the fixed OSD mode or the floating OSD mode is input, the superposition unit 1006 obtains the image file in accordance with the superposition mode specified by the relevant address from the storage unit 1002 and performs the superposition of the image file obtained in the specified superposition mode.

The reception apparatus 2000 transmits the parameter for superposing the image identified by the address of the set image file on the picked-up image to the image pickup apparatus 1000 in a case where the Create button or the Modify button which will be described below is pressed.

A Create button 7005 is a button for generating an OSD in accordance with the set parameter to be set in the image pickup apparatus 1000. The reception apparatus 2000 issues the CreateOSD command to the image pickup apparatus 1000 when the Create button 7005 is pressed. Subsequently, the SetOSD command is executed by using the returned OSDToken with respect to the image pickup apparatus 1000 while following the content input by the user.

A Modify button 7006 is a button for setting the OSD with respect to the image pickup apparatus 1000. When this button is pressed, the reception apparatus 2000 executes the SetOSD command with respect to the image pickup apparatus 1000 by using the previously stored OSDToken while following the content input on the screen of FIG. 15A by the user.

A Delete button 7007 is a button for command the image pickup apparatus 1000 to delete the OSD. When this button is pressed, the reception apparatus 2000 executes the DeleteOSD command with respect to the image pickup apparatus 1000 by using the previously stored OSDToken.

FIG. 15B illustrates a screen at a time the OSD is set in when the second superposition mode (floating OSD mode). In the example of FIG. 15B, Model, that is, the second superposition mode is selected for the OSD Mode 7000.

When the second superposition mode is selected, the TEXT is automatically selected for the OSD Type 7001, and the type of the Text is not to be selected by the user in the TEXT Detail 7003. According to the present embodiment, the type of the Text is automatically set as the predetermined specified text string (for example, blank). In a case where a second command for commanding a setting of the second superposition mode is received, the reception apparatus 2000 can transmit the parameter for specifying the text information of the particular type to the image pickup apparatus 1000 as described above.

When the SetOSD command is transmitted to the reception apparatus 2000, the reception apparatus 2000 sets a parameter in OSD Text Configuration to be matched with the condition of the above-described specified text string. The second superposition mode can be selected through the superposition mode determination processing in the image pickup apparatus 1000 as described above.

The first superposition mode for superposing the superposition information on the predetermined position on the display screen of the picked-up image and the second superposition mode for superposing the superposition information in the predetermined range of the picked-up image while tracking the change in the picked-up image displayed on the display screen are set as described above. Alternatively, the first superposition mode for superposing the superposition information on the predetermined position on the display screen of the picked-up image and the second superposition mode for superposing the superposition information on the image pickup range of the image pickup unit or the area on the display screen in accordance with the change in the picked-up image are set.

With the above-described configuration, the reception apparatus 2000 can issue the instruction of superposing the image on the predetermined position on the display screen of the picked-up image and the instruction of superposing the superposition information in the predetermined range of the picked-up image in accordance with the change in the picked-up image to the image pickup apparatus 1000 by the single communication interface.

The superposition unit 1006 may perform mask processing instead of the floating OSD superposition processing as the second superposition mode according to the present embodiment. The mask processing is processing of superposing the mask image on the image of the predetermined subject to limit the viewing of the image of the predetermined subject in the picked-up image. The method of superposing the mask image is similar to the floating OSD superposing method, and the superposition information (mask image) is superposed on the picked-up image so that the position of the superposition information on the display screen of the picked-up image is changed in accordance with the position of the predetermined subject in the picked-up image. In a case where the predetermined subject is an immovable subject such as, for example, a house or a signboard, the position of the predetermined subject on the display screen of the picked-up image is changed in accordance with the change in the image pickup direction of the image pickup unit 1003. In the above-described case, the mask image is superposed on the picked-up image in a manner that the subject is kept being masked.

The superposition of the superposition information (OSD) by the OSD mode and the superposition of the superposition information (mask image) by the mask processing are selected by using the communication interface for setting the OSD, and it is possible to conduct the superposition of the superposition information with respect to the picked-up image as described above. According to the present invention, the transmission and reception system including the single communication interface can perform the transmission and reception of the instruction of superposing the image on the predetermined position on the display screen of the picked-up image and the instruction of superposing the superposition information in the predetermined range of the picked-up image in accordance with the change in the picked-up image.

Second Embodiment

Hereinafter, a second embodiment of the present invention will be described. According to the first embodiment, the case has been described in which the two superposition modes are selected on the basis of the content of the OSDTextConfiguration. However, the two superposition modes may be selected on the basis of the content of the OSDImgConfiguration. According to the second embodiment, an example will be described in which the two superposition modes are selected on the basis of the content of the OSDImgConfiguration.

In addition, according to the first embodiment, the embodiment using the image pickup apparatus 1000 including the pan mechanism 1101, the tilt mechanism 1102, and the zoom mechanism 1103 has been described. However, the present invention may also be applied to a camera that does not include the pan mechanism 1101, the tilt mechanism 1102, and the zoom mechanism 1103. According to the second embodiment, an example will be described in which the present invention is applied to the camera that does not include the pan mechanism 1101, the tilt mechanism 1102, and the zoom mechanism 1103.

Moreover, according to the first embodiment, since the OSDConfiguration is held as a unique parameter, plural dedicated-use commands for dealing with the OSD (for example, the CreateOSD command) are prepared. However, the OSDConfiguration may be held as one parameter belonging to VideoSourceConfiguration. The OSD processing function may be realized by using a command in related are for dealing with the VideoSourceConfiguration as described above. According to the second embodiment, a case will be described in which the OSDConfiguration is held as one parameter belonging to the VideoSourceConfiguration.

Figure 1C:
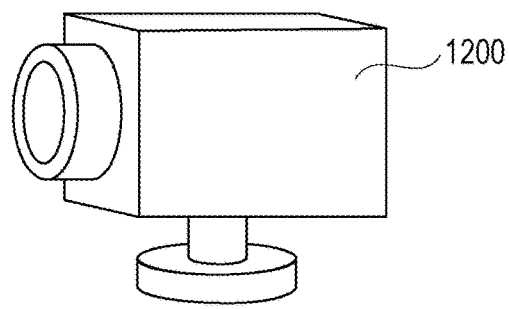
FIG. 1C illustrates an example of an image pickup apparatus according to a second embodiment.

The second embodiment of the present invention which takes the above-described points into account will be described below. A configuration of an image pickup system according to the second embodiment is the same as that described by using FIG. 1A according to the first embodiment. Particularly, according to the second embodiment, processing conducted by the image pickup apparatus 1200 connected to the network 1500 will be described. FIG. 1C illustrates the image pickup apparatus 1200. The image pickup apparatus 1200 is different from the image pickup apparatus 1000 described by using FIG. 1B according to the first embodiment in that the pan mechanism 1101, the tilt mechanism 1102, and the zoom mechanism 1103 are not provided. In addition, a difference resides in that the image pickup apparatus 1200 detects a particular subject among the picked-up image as compared with the image pickup apparatus 1000 described by using FIG. 1B according to the first embodiment.

An internal configuration of the image pickup apparatus 1200 according to the second embodiment will be described by using FIG. 2B. Since the control unit 1001, the storage unit 1002, the image pickup unit 1003, and the communication unit 1004 are the same as the configurations described by using FIG. 2A according to the first embodiment, a description thereof will be omitted.

The image pickup apparatus 1200 is different from the image pickup apparatus 1000 in that the image pickup control unit 1005 is not provided. The image pickup apparatus 1200 is also different from the image pickup apparatus 1000 in that a detection unit 1007 is provided.

The detection unit 1007 is configured to detect a particular subject in image data obtained from the image pickup unit 1003 and notifies the control unit 1001 of the image data. The predetermined subject detected by the detection unit can be set, for example, as a subject that matches a pattern image previously stored in the storage unit. Alternatively, the predetermined subject detected by the detection unit 1007 may be a subject having a predetermined characteristic amount (for example, a size, a shape, or the like) previously stored in the storage unit. Alternatively, the predetermined subject detected by the detection unit 1007 can be set as a moving body in the picked-up image. For example, an inter-frame difference method, a background difference method, or the like can be used for a method of detecting a moving body, but the method is not limited to this.

In a case where the superposition information is superposed in the second superposition mode (floating OSD mode), the superposition unit 1006 changes the position of the superposition information in the picked-up image in accordance with a detection result of the detection unit 1007 and superposes the superposition information on the picked-up image.

Next, a structure of parameters held by the image pickup apparatus 1200 according to the present embodiment will be described. Similarly as described by using FIG. 3 according to the first embodiment, the VideoSourceConfiguration 6102 includes the OSDConfiguration 6105. According to the present embodiment, the OSDConfiguration 6105 includes an Enabled flag indicating whether the superposition display of the OSD is valid or invalid.

Also, according to the present embodiment, the image pickup apparatus 1200 does not have the parameter of PTZConfiguration. Since the other parameters are the same as the contents described by using FIG. 3 according to the first embodiment, a description thereof will be omitted.

Next, a command sequence between the image pickup apparatus 1200 and the reception apparatus 2000 from the setting start until the video distribution according to the present embodiment will be described. According to the present embodiment, the transaction 7102 and the transaction 7106 among the command sequences described by using FIG. 4 according to the first embodiment are not conducted. Since the other transactions are same as the contents described by using FIG. 4 according to the first embodiment, a description thereof will be omitted.

Figure 5B:
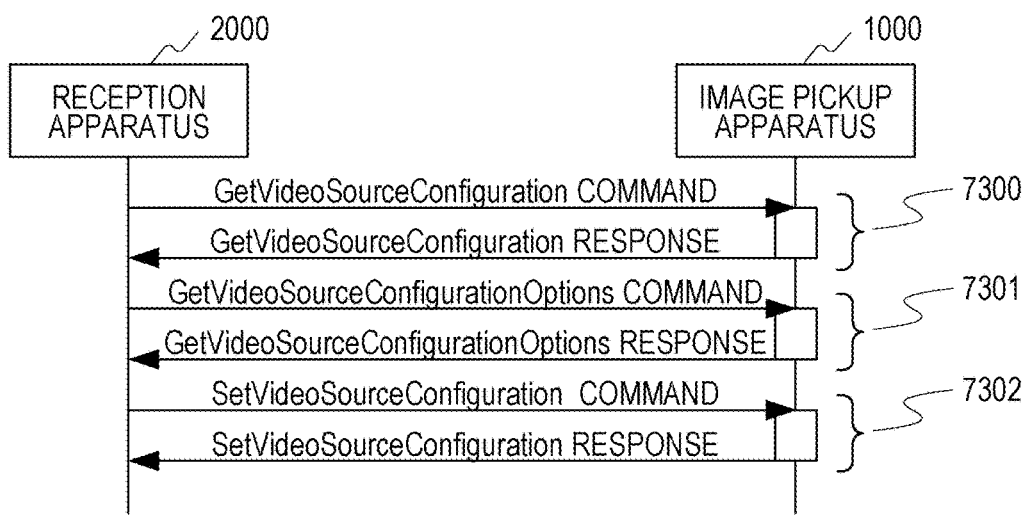
FIG. 5B illustrates a command sequence of VideoSourceConfiguration.

Next, an OSD setting command sequence according to the present embodiment will be described by using FIG. 5B.

A transaction 7300 is a transaction of a GetVideoSourceConfiguration command.

The GetVideoSourceConfiguration command is a command for the reception apparatus 2000 to instruct the image pickup apparatus 1200 to return the specified VideoSourceConfiguration 6102. According to the present embodiment, the specified VideoSourceConfiguration 6102 includes the OSDConfiguration 6105 illustrated in FIG. 3.

A transaction 7301 is a transaction of GetVideoSourceConfigurationOptions. The GetVideoSourceConfigurationOptions command is a command for the reception apparatus 2000 to instruct the image pickup apparatus 1000 to return a selection range of the respective parameters or an option. This parameter or option includes the OSDConfiguration 6105 that can be set by a SetVideoSoruceConfiguration command which will be described below.

A transaction 7302 is a transaction of a SetVideoSourceConfiguration command. The SetVideoSourceConfiguration command is a command for instructing edition of the respective parameters of the VideoSourceConfiguration. This VideoSourceConfiguration includes the OSDConfiguration 6105.

The image pickup apparatus 1200 edits the contents of the OSDConfiguration 6105 included in the VideoSourceConfiguration through the execution of the SetVideoSourceConfiguration. According to this, the image pickup apparatus 1200 switches display or non-display of the OSD or change the color, the size, the position of the currently displayed OSD, or the like. Detail processing of the present command in the image pickup apparatus 1200 will be described below.

Next, a relationship between the OSD, the superposition display position, and the coordinates in the image pickup apparatus 1200 will be described by using FIG. 8 and FIG. 9A and FIG. 9B.

Figure 8:
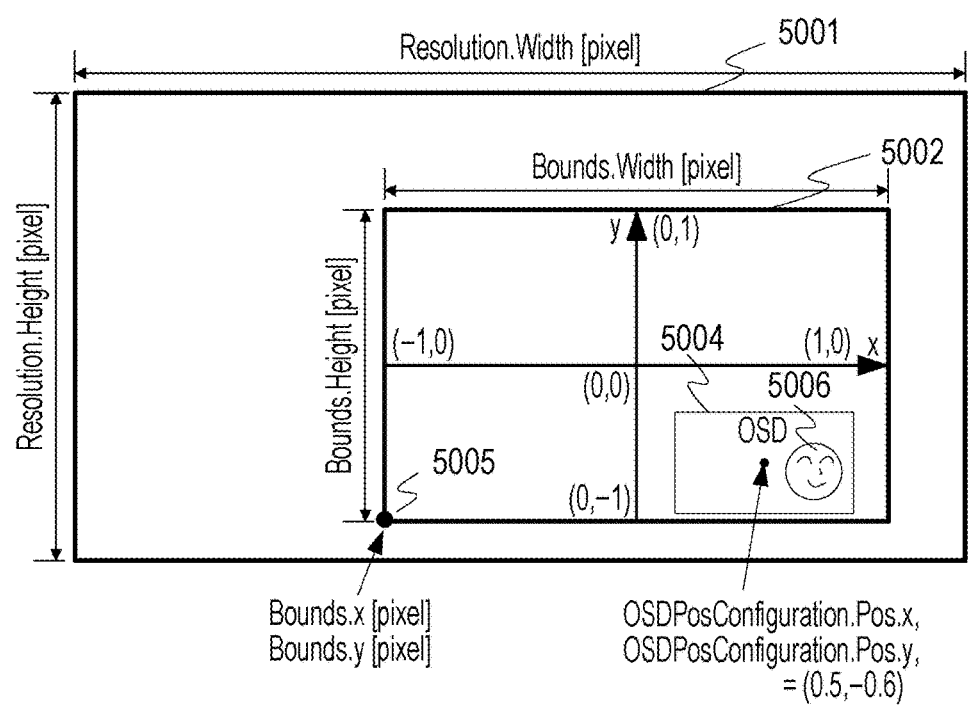
FIG. 8 illustrates a relationship between the image pickup available range and the OSD superposition position according to the second embodiment.

In FIG. 8, the image data 5001 indicates image data output by the image pickup unit 1003 at a certain zoom magnification. The distribution image 5002 represents a distribution image specified by the Bounds included in the VideoSourceConfiguration 6102. The OSD 5004 is an OSD specified by the OSDConfiguration 6105. In FIG. 8, the subject 5006 exists in a part where the OSD 5004 of the image data 5001 is superposed.

The parameter Bounds indicates a cutout position in the image data 5001. In the example of FIG. 8, the Bounds includes parameters of a horizontal direction position (x) and a vertical direction position (y) that specify an apex of the lower left of the distribution image and parameters of a horizontal direction size (Width) and a vertical direction size (Height) that specify a size of the distribution image byway of pixels.

The position of the OSD 5004 in the example of FIG. 8 is specified by using the normalized coordinate system where the distribution image 5002 cut out by the Bounds is normalized to −1.0 to +1.0 in both the horizontal direction (x) and the direction (y). The center point of the OSD 5004 is specified by the OSDPosConfiguration. In the example of FIG. 8, the display position of the OSD 5004 is specified as (x, y)=(0.5, −0.6) in the distribution image 5002.

Figure 9A:
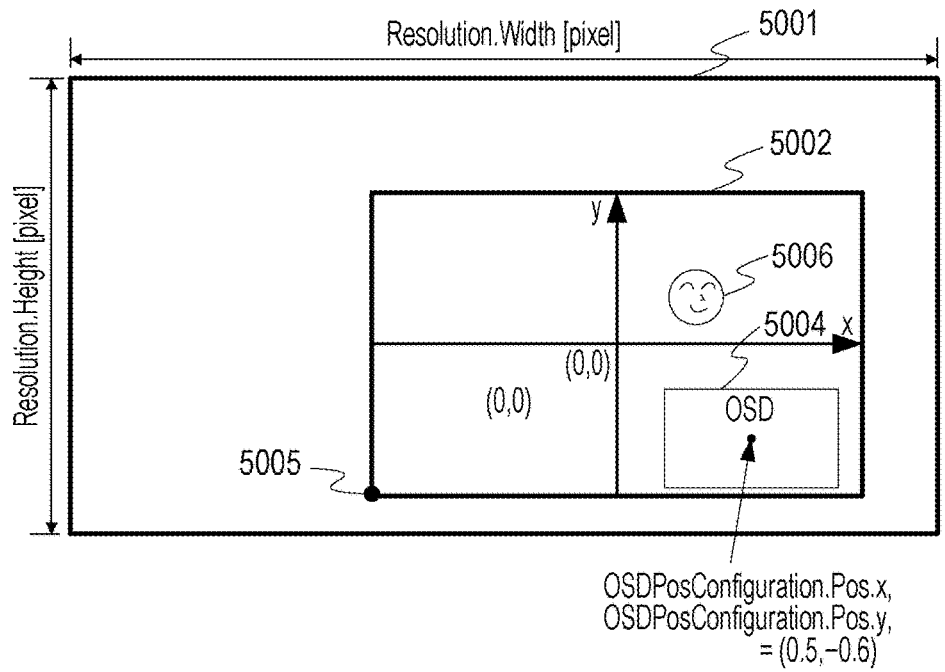
FIG. 9A illustrates a relationship between an image pickup range at a time when the position of the subject is changed in the first superposition mode and the OSD superposition position.

FIG. 9A illustrates the display position of the OSD 5004 at a time when the subject 5006 is moved from the area illustrated in FIG. 8 to another area in a case where the OSD 5004 is in the first superposition mode (fixed OSD mode). In this case, the display position of the OSD 5004 in the distribution image 5005 is kept at the same position. That is, the OSD does not track the subject.

Figure 9B:
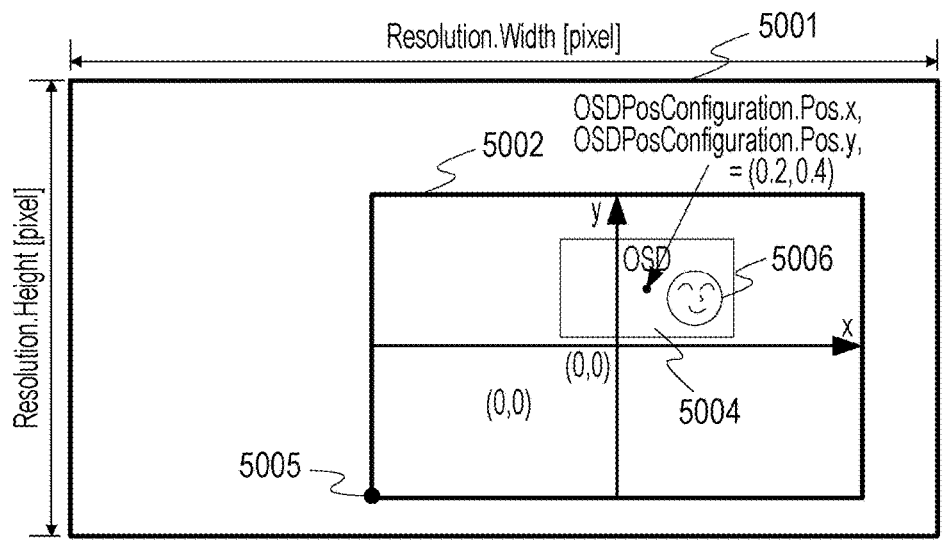
FIG. 9B illustrates a relationship between the image pickup range at a time when the position of the subject is changed in the second superposition mode and the OSD superposition position.

FIG. 9B illustrates the display position of the OSD 5004 at a time when the subject 5006 is moved from the area illustrated in FIG. 8 to another area in a case where the OSD 5004 is in the second superposition mode (floating OSD mode). In this case, the superposition position of the OSD 5004 in the distribution image 5005 is not kept at the same position, and the OSD 5004 is processed to be regularly superposed and displayed in an area where the subject 5006 exists. That is, the position of the OSD 5004 in the distribution image 5005 is changed while the OSD tracks the subject.

Figure 13A:
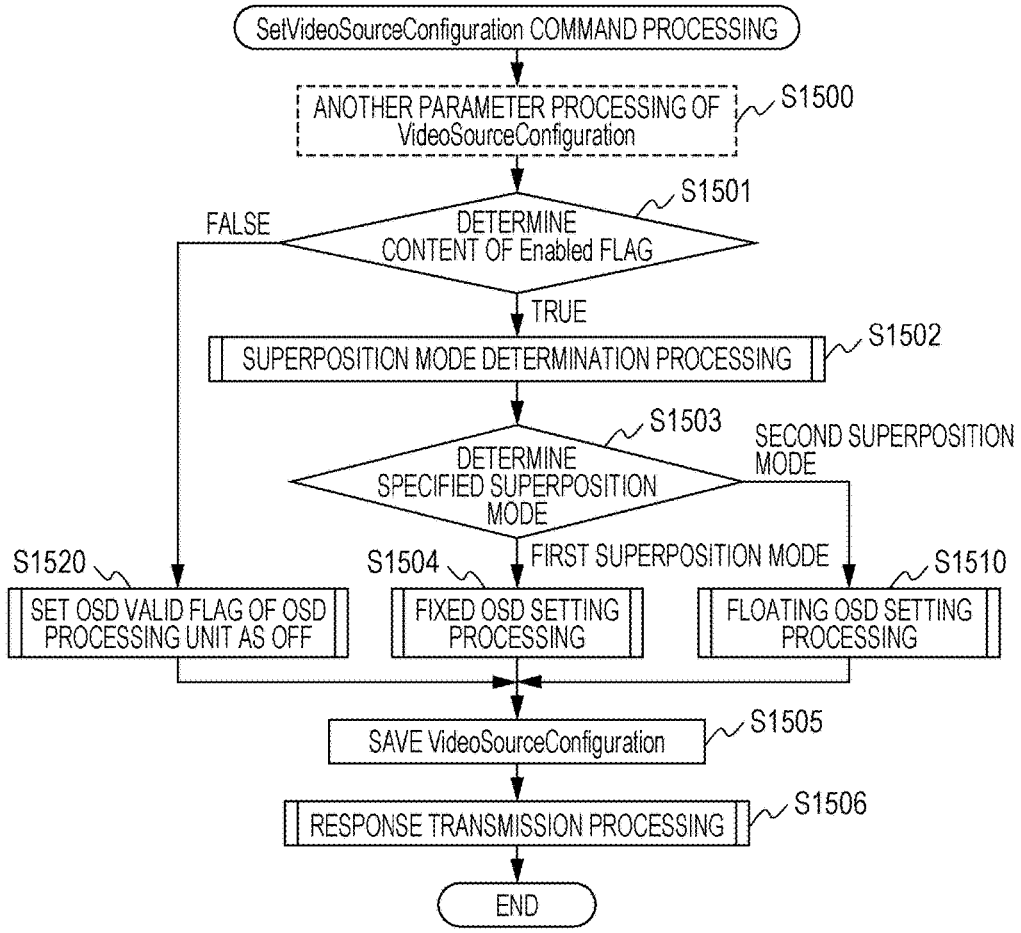
FIG. 13A illustrates a flow of VideoSourceConfiguration setting processing according to the second embodiment.

Next, processing in a case where the image pickup apparatus 1200 receives the SetVideoSourceConfiguration command from the reception apparatus 2000 the reception apparatus 2000 will be described by using FIG. 13A. In the mode where the control unit 1001 of the image pickup apparatus 1200 includes the built-in processor, the processing flow of FIG. 13A represents the program for causing the control unit 1001 to execute the procedures illustrated in FIG. 13A. The processor built in the control unit 1001 of the image pickup apparatus 1000 is a computer and executes the program read out from the storage unit 1002 built in the image pickup apparatus 1000.

In step S1500, the control unit 1001 performs parameter processing other than the OSDConfiguration included in the VideoSourceConfiguration. A detail of which will be omitted.

In step S1501, the control unit 1001 determines the Enabled flag included in the input OSDConfiguration 6105. In case of True, the control unit 1001 shifts the processing to step S1502. In case of False, the control unit 1001 shifts the processing to step S1520.

In step S1502, the control unit 1001 executes the superposition mode determination processing which will be described below. The superposition mode determination processing determines whether the content of the OSDConfiguration included in the input VideoSourceConfiguration indicates the first superposition mode or the second superposition mode and outputs a determination result. Herein, the first superposition mode corresponds to the above-described fixed OSD mode, and the second superposition mode corresponds to the above-described floating OSD mode.

In step S1503, the control unit 1001 refers to the superposition mode determination processing result in step S1502. The control unit 1001 then shifts the processing to step S1504 in a case where the content of the OSDConfiguration is the first superposition mode and shifts the processing to step S1510 in a case where the content is the second superposition mode.

In step S1504, the control unit 1001 executes the above-described fixed OSD setting processing. After the execution, the control unit 1001 shifts the processing to step S1505. In step S1510, the control unit 1001 executes the above-described floating OSD setting processing. After the execution, the control unit 1001 shifts the processing to step S1505.

In step S1505, the control unit 1001 saves the OSDConfiguration in the storage unit 1002. In step S1506, the control unit 1001 executes response transmission processing for returning a response with respect to the SetVideoSourceConfiguration command to the reception apparatus 2000.

Figure 13B:
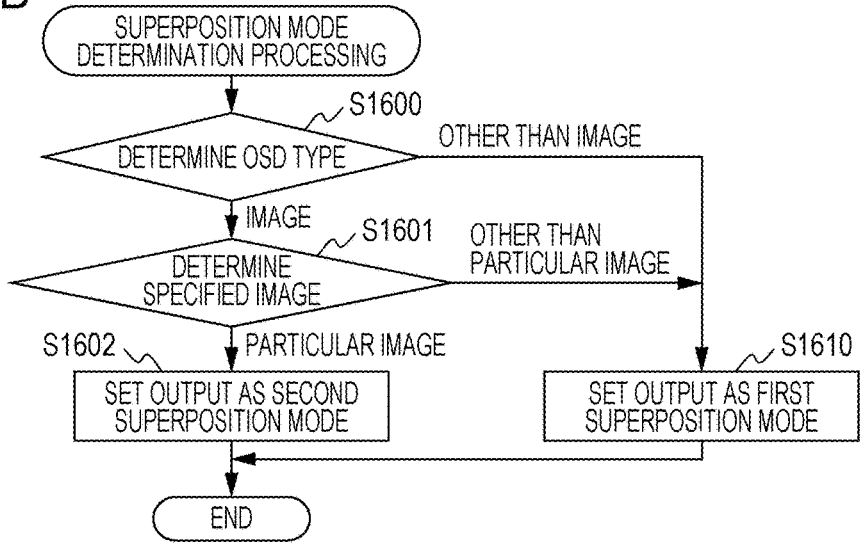
FIG. 13B illustrates a flow of superposition mode determination processing according to the second embodiment.

Next, the superposition mode determination processing (S1503) according to the present embodiment will be described by using FIG. 13B. In the mode where the control unit 1001 of the image pickup apparatus 1200 includes the built-in processor, the processing flow of FIG. 13B represents the program for causing the control unit 1001 to execute the procedures illustrated in FIG. 13B. The processor built in the control unit 1001 of the image pickup apparatus 1000 is a computer and executes the program read out from the storage unit 1002 built in the image pickup apparatus 1000.

In step S1600, the control unit 1001 determines whether or not the OSDType of the input OSDConfiguration is the IMAGE, that is, the image information. The control unit 1001 shifts the processing to S1610 in a case where the OSDType is other than the IMAGE.

In step S1601, the control unit 1001 determines whether or not the address specified by the Image File Path is the particular address as the OSD. This address information is a parameter for specifying a type of the image to be superposed. The control unit 1001 shifts the processing to S1602 in a case where the address specified by the Image File Path is the particular address that specifies the image of the particular type. In step S1602, the superposition mode determination processing is ended while the output is set as the second superposition mode (floating OSD mode). On the other hand, the control unit 1001 shifts the processing to S1610 in a case where the address specified by the Image File Path is the particular address. That is, in a case where the address specified by the Image File Path is a parameter for specifying the image of the type other than the particular type, in step S1610, the superposition mode determination processing is ended while the output is set as the first superposition mode (fixed OSD mode).

The particular address herein may be the address of the image file used as the OSD in the second superposition mode but is not limited to this. The OSD used in the second superposition mode may be an OSD based on an internal setting, and the particular address may also be a virtual particular text string. The particular address may also include the size of the OSD displayed in the second superposition mode or the parameter for specifying the subject of the superposition target.

Figure 14:
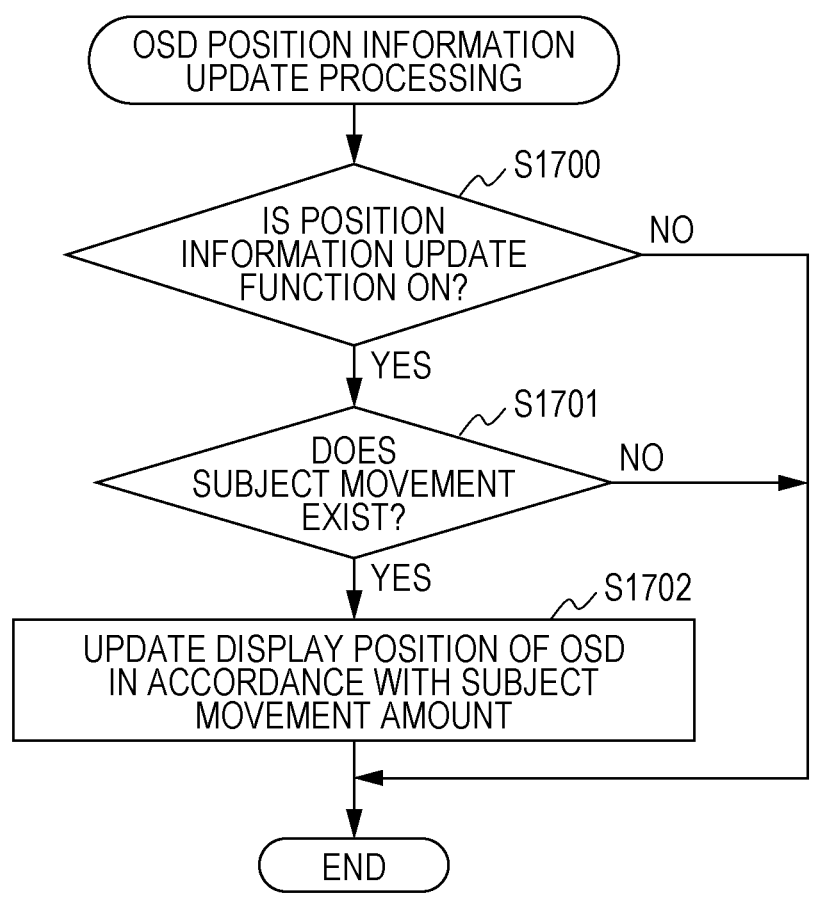
FIG. 14 illustrates a flow of OSD position information update processing according to the second embodiment.

Next, the OSD position information update processing will be described by using FIG. 14. The present processing will be described as processing to be executed by the processor independent from the control unit 1001 included in the superposition unit 1006. In the mode where the superposition unit 1006 includes the built-in processor, the process flow of FIG. 14 represents a program for causing the processor of the superposition unit 1006 to execute the procedure illustrated in FIG. 14. The processor built in the superposition unit 1006 is a computer and executes the program read out from the storage unit 1002 built in the image pickup apparatus 1000.

Alternatively, the control unit 1001 may execute the OSD position information update processing. In the mode where the control unit 1001 of the image pickup apparatus 1000 includes the built-in processor, the processing flow of FIG. 14 represents the program for causing the control unit 1001 to execute the procedures illustrated in FIG. 14. The processor built in the control unit 1001 of the image pickup apparatus 1000 is a computer and executes the program read out from the storage unit 1002 built in the image pickup apparatus 1000.

In step S1700, the superposition unit 1006 determines whether or not the position information update function is OFF. The present processing is ended if the function is OFF.

In step S1701, the superposition unit 1006 determines whether or not a change occurs in the position and the size of the subject included in the OSD 5004 by querying the detection unit 1007. The present processing is ended in a case where the change does not occur. On the other hand, in a case where the change occurs, for example, a case where the position of the subject 5006 of FIG. 8 is moved to the position of the subject 5006 of FIG. 9B, the control unit 1001 shifts the processing to step S1702.

In step S1702, the superposition unit 1006 recalculates the position and the size of the OSD on the basis of the changed position information and size of the subject obtained from the detection unit 1007 so that the OSD is superposed and displayed on the subject 5006 and updates the OSD that is currently superposed and displayed on the distribution image 5002.

FIG. 15A and FIG. 15C illustrate examples of the screen of the user interface for the OSD setting in the reception apparatus 2000. Since FIG. 15A is the same content described according to the first embodiment, a description thereof will be omitted.

FIG. 15C illustrates the user interface at a time when the OSD is set in the second superposition mode. With regard to the OSD Mode 7000 in the example of FIG. 15C, Mode1, that is, the second superposition mode is selected. According to this, the IMAGE is automatically selected for the OSD Type 7001. The TEXT Detail 7003 and the IMAGE Detail 7004 are not to be edited by the user. When the SetOSD command is transmitted to the reception apparatus 2000, the reception apparatus 2000 sets a parameter in the OSDImgConfiguration so as to be matched with the condition of the above-described specified address. The second superposition mode can thus be selected the superposition mode determination processing in the image pickup apparatus 1200 as described above.

According to the second embodiment described above, the reception apparatus 2000 can also issue a first instruction and a second instruction to the image pickup apparatus 1200 that does not include the pan and tilt mechanisms by the single communication interface. The first instruction is an instruction of superposing a superposition image on the picked-up image in the first superposition mode for superposing the superposition information on the predetermined position on the display screen of the picked-up image. The second instruction is an instruction of superposing a superposition image on the picked-up image in the second superposition mode for superposing the superposition information in the predetermined range of the picked-up image while tracking the change in the picked-up image displayed on the display screen. The determination of the superposition mode can also be realized by the image information in addition to the text string information specified as the OSD.

Thus far, the monitoring camera and the operation of the application program where the present invention is implemented according to the first and second embodiments have been described, but the embodiments are not limited to the above-described configurations and may also partly be changed. That is, the particular text string is adopted according to the first embodiment and the particular address is adopted according to the second embodiment as the determination method for the superposition mode, but the configuration is not limited to this. For example, it is possible to perform the superposition of the superposition information in the first superposition mode (fixed OSD mode) in a case where the parameter for setting the superposition information indicates that the superposition information is set as the text information. On the other hand it is possible to perform the superposition of the superposition information in the second superposition mode (floating OSD mode) in a case where the superposition information indicates that the superposition information is not set as the text information.

Alternatively, both the processing illustrated in FIG. 10B and the processing illustrated in FIG. 13B may be executed as the determination processing for the superposition mode. In addition, both the processing illustrated in FIG. 12 and the processing illustrated in FIG. 14 may be executed and the both may be combined and adopted with each other as the OSD position information update processing.

According to the second embodiment, the subject set as the superposition target when the position of the OSD is updated in the second superposition mode corresponds to the subject included in the area set by the OSD but is not limited to this. The subject corresponding to the target of the OSD superposition display may also be specified by another interface or in the OSDConfiguration.

The external appearance and the shape of the OSD are not limited to the contents mentioned according to the present embodiment, and the present invention can be applied to the components even when the OSDs having the other various external appearance and the shapes are adopted. For example, an OSD where a target area is subjected to mosaic processing or an OSD where a luminance, a sharpness, or the like is changed may also be used. The method based on the BoxSize parameter is adopted as the specification method for the size of the OSD but is not limited to this. The other methods such as a method of specifying a rectangular by a parameter for setting a polygon and a method of specifying a horizontal width and a longitudinal width by spaces and line feed codes input in the PlainText may also be adopted.

According to the embodiments of the present invention, the transmission and reception system including the single communication interface can perform the transmission and reception of the instruction of superposing the image on the predetermined position on the display screen of the picked-up image and the instruction of superposing the superposition information in the predetermined range of the picked-up image in accordance with the change in the picked-up image.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image transmission apparatus comprising:
a reception unit configured to receive a first command and a second command from an external apparatus, wherein the first command is a command to superpose first text information on a picked-up image picked up by an image pickup unit, and wherein the second command is a command to superpose second text information, different from the first text information, on the picked-up image; and
a transmission unit configured to transmit a superposed image in which the first text information and the second text information are superposed on the picked-up image, when the reception unit receives the first command and the second command,
wherein the superposed image is an image in which the first text information is superposed on a position which does not change relative to the picked-up image in accordance with a change of at least one of a pan angle, a tilt angle, and a zoom magnification of the image pickup unit, and
wherein the superposed image is an image in which the second text information is superposed in accordance with the change of at least one of the pan angle, the tilt angle, and the zoom magnification.

2. The image transmission apparatus according to claim 1, wherein the first command is a command for a first superposition mode, and
wherein the second command is a command for a second superposition mode.

3. The image transmission apparatus according to claim 2, wherein the first command includes a parameter value indicating that the first command is the command for the first superposition mode, and
wherein the second command includes a parameter value indicating that the second command is the command for the second superposition mode.

4. The image transmission apparatus according to claim 1, wherein the first text information is superposed on a fixed position in the picked-up image.

5. The image transmission apparatus according to claim 1, wherein the second text information is superposed on a variable position in accordance with the change.

6. The image transmission apparatus according to claim 1, wherein the second text information is information in accordance with a status of the pan angle.

7. The image transmission apparatus according to claim 1, wherein the second text information is information in accordance with a status of the tilt angle.

8. The image transmission apparatus according to claim 1, wherein the second text information is information in accordance with a status of the zoom magnification.

9. The image transmission apparatus according to claim 1, wherein the first command designates a size of text for the first text information.

10. The image transmission apparatus according to claim 1, wherein the first command designates color of text for the first text information.

11. The image transmission apparatus according to claim 1, wherein the first command designates whether text for the first text information is transparent.

12. The image transmission apparatus according to claim 1, wherein the first command designates color of background for the first text information.

13. The image transmission apparatus according to claim 1, wherein when the second command includes first parameter value, the second text information is superposed in accordance with the change.

14. The image transmission apparatus according to claim 13, wherein, when the second command includes a second parameter value different from the first parameter value, the second text information is superposed on a fixed position in the picked-up image.

15. The image transmission apparatus according to claim 1, wherein the transmission unit transmits the superposed image to the external apparatus.

16. A method for an image transmission apparatus, the method comprising:
receiving a first command and a second command from an external apparatus, wherein the first command is a command to superpose first text information on a picked-up image picked up by an image pickup unit, and wherein the second command is a command to superpose second text information, different from the first text information, on the picked-up image; and
transmitting a superposed image in which the first text information and the second text information are superposed on the picked-up image, when the first command and the second command are received,
wherein the superposed image is an image in which the first text information is superposed on a position which does not change relative to the picked-up image in accordance with a change of at least one of a pan angle, a tilt angle, and a zoom magnification of the image pickup unit, and
wherein the superposed image is an image in which the second text information is superposed in accordance with the change of at least one of the pan angle, the tilt angle, and the zoom magnification.

17. A non-transitory computer-readable storage medium storing a program to cause an image transmission apparatus to perform a method, the method comprising:
receiving a first command and a second command from an external apparatus, wherein the first command is a command to superpose first text information on a picked-up image picked up by an image pickup unit, and wherein the second command is a command to superpose second text information, different from the first text information, on the picked-up image; and
transmitting a superposed image in which the first text information and the second text information are superposed on the picked-up image, when the the first command and the second command are received,
wherein the superposed image is an image in which the first text information is superposed on a position which does not change relative to the picked-up image in accordance with a change of at least one of a pan angle, a tilt angle, and a zoom magnification of the image pickup unit, and
wherein the superposed image is an image in which the second text information is superposed in accordance with the change of at least one of the pan angle, the tilt angle, and the zoom magnification.

18. An image transmission apparatus comprising:
a computer to execute instructions that, when executed by the computer, cause the computer to function as:
a reception control unit configured to receive a first command and a second command from an external apparatus, wherein the first command is a command to superpose first text information on a picked-up image picked up by an image pickup unit, and wherein the second command is a command to superpose second text information, different from the first text information, on the picked up image, and
a transmission control unit configured to transmit a superposed image in which the first text information and the second text information are superposed on the picked-up image, when the reception control unit receives the first command and the second command,
wherein the superposed image is an image in which the first text information is superposed on a position which does not change relative to the picked-up image in accordance with a change of at least one of a pan angle, a tilt angle, and a zoom magnification of the image pickup unit, and
wherein the superposed image is an image in which the second text information is superposed in accordance with the change of at least one of the pan angle, the tilt angle, and the zoom magnification.

19. The image transmission apparatus according to claim 18,
wherein the first command is a command for a first superposition mode, and
wherein the second command is a command for a second superposition mode.

20. The image transmission apparatus according to claim 19,
wherein the first command includes a parameter value indicating that the first command is the command for the first superposition mode, and
wherein the second command includes a parameter value indicating that the second command is the command for the second superposition mode.

21. The image transmission apparatus according to claim 18, wherein the first text information is superposed on a fixed position in the picked-up image.

22. The image transmission apparatus according to claim 18, wherein the second text information is superposed on a variable position in accordance with the change.

23. The image transmission apparatus according to claim 18, wherein the second text information is information in accordance with a status of the pan angle.

24. The image transmission apparatus according to claim 18, wherein the second text information is information in accordance with a status of the tilt angle.

25. The image transmission apparatus according to claim 18, wherein the second text information is information in accordance with a status of the zoom magnification.

26. The image transmission apparatus according to claim 18, wherein the first command designates a size of text for the first text information.

27. The image transmission apparatus according to claim 18, wherein the first command designates color of text for the first text information.

28. The image transmission apparatus according to claim 18, wherein the first command designates whether text for the first text information is transparent.

29. The image transmission apparatus according to claim 18, wherein the first command designates color of background for the first text information.

30. The image transmission apparatus according to claim 18, wherein when the second command includes first parameter value, the second text information is superposed in accordance with the charge.

31. The image transmission apparatus according to claim 30, wherein, when the second command includes a second parameter value different from the first parameter value, the second text information is superposed on a fixed position in the picked-up image.

32. The image transmission apparatus according to claim 18, wherein the transmission control unit transmits the superposed image to the external apparatus.

* * * * *